United States Patent
Wu

(10) Patent No.: US 11,966,872 B2
(45) Date of Patent: Apr. 23, 2024

(54) SERVICE QUALITY EVALUATION METHOD AND TERMINAL DEVICE

(71) Applicant: Huawei Technologies Co., Ltd., Shenzhen (CN)

(72) Inventor: Bin Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 130 days.

(21) Appl. No.: 16/579,284

(22) Filed: Sep. 23, 2019

(65) Prior Publication Data

US 2020/0019913 A1 Jan. 16, 2020

Related U.S. Application Data

(63) Continuation of application No. PCT/CN2017/112388, filed on Nov. 22, 2017.

(30) Foreign Application Priority Data

Mar. 28, 2017 (CN) .......................... 201710193293.3

(51) Int. Cl.
*G06Q 10/0639* (2023.01)
*G06F 3/0346* (2013.01)
(Continued)

(52) U.S. Cl.
CPC ..... *G06Q 10/06395* (2013.01); *G06Q 30/016* (2013.01); *G06Q 30/0282* (2013.01); *G06F 3/0346* (2013.01)

(58) Field of Classification Search
None
See application file for complete search history.

(56) References Cited

U.S. PATENT DOCUMENTS

2009/0262074 A1* 10/2009 Nasiri ................ G06F 3/04817
345/158
2010/0274787 A1* 10/2010 Lu .......................... G06F 16/35
707/E17.089
(Continued)

FOREIGN PATENT DOCUMENTS

CN 101441660 A 5/2009
CN 102073677 A 5/2011
(Continued)

OTHER PUBLICATIONS

Maqsud, "Synthetic Text Generation for Sentiment Analysis," 2015, Proceedings of the 6th Workshop on Computational Approaches to Subjectivity, Sentiment and Social Media Analysis, pp. 156-161 (Year: 2015).*

(Continued)

*Primary Examiner* — Ivan R Goldberg
(74) *Attorney, Agent, or Firm* — Conley Rose, P.C.

(57) ABSTRACT

A service quality evaluation method and a terminal device for a communications field includes obtaining a candidate evaluation phrase set including at least one first candidate evaluation phrase, where the at least one first candidate evaluation phrase is obtained by analyzing to-be-analyzed evaluation data of a target service using a target analysis model, wherein the at least one first candidate evaluation phrase includes an evaluation phrase having personalized information content to evaluate service quality of the target service, displaying the at least one first candidate evaluation phrase and a first to-be-selected evaluation phrase, determining a first action type according to an obtained first moving track, determining a target evaluation phrase from the at least one first candidate evaluation phrase and the first to-be-selected evaluation phrase according to the first action type, and sending service quality evaluation content including the target evaluation phrase.

20 Claims, 12 Drawing Sheets

(51) Int. Cl.
*G06Q 30/016* (2023.01)
*G06Q 30/0282* (2023.01)

(56) References Cited

U.S. PATENT DOCUMENTS

| | | | |
|---|---|---|---|
| 2011/0153387 A1* | 6/2011 | Ma | G06Q 30/0203 705/7.32 |
| 2015/0378587 A1* | 12/2015 | Falaki | G06F 3/0346 715/747 |
| 2016/0253719 A1* | 9/2016 | Akpala | G06Q 30/0282 705/347 |
| 2016/0267377 A1* | 9/2016 | Pan | G06Q 30/0201 |

FOREIGN PATENT DOCUMENTS

| | | |
|---|---|---|
| CN | 102663622 A | 9/2012 |
| CN | 102855256 A | 1/2013 |
| CN | 103207914 A | 7/2013 |
| CN | 103345347 A | 10/2013 |
| CN | 103885584 A | 6/2014 |
| CN | 104463679 A | 3/2015 |
| CN | 104731874 A | 6/2015 |
| CN | 104881237 A | 9/2015 |
| CN | 105550888 A | 5/2016 |
| CN | 106097193 A | 11/2016 |

OTHER PUBLICATIONS

Dong, "Towards an Intelligent Reviewer's Assistant: Recommending Topics to Help Users to Write Better Product Reviews," 2012, Proceedings of the 2012 ACM International Conference on Intelligent User Interfaces, pp. 159-168 (Year: 2012).*

Machine Translation and Abstract of Chinese Publication No. CN101441660, May 27, 2009, 16 pages.
Machine Translation and Abstract of Chinese Publication No. CN102663622, Sep. 12, 2012, 14 pages.
Machine Translation and Abstract of Chinese Publication No. CN102855256, Jan. 2, 2013, 46 pages.
Machine Translation and Abstract of Chinese Publication No. CN103207914, Jul. 17, 2013, 12 pages.
Machine Translation and Abstract of Chinese Publication No. CN103345347, Oct. 9, 2013, 20 pages.
Machine Translation and Abstract of Chinese Publication No. CN103885584, Jun. 25, 2014, 22 pages.
Machine Translation and Abstract of Chinese Publication No. CN104881237, Sep. 2, 2015, 30 pages.
Machine Translation and Abstract of Chinese Publication No. CN106097193, Nov. 9, 2016, 29 pages.
Zeng, G., "CRFs-Based Chinese Named Enitity Recognition with Improved Tag Set," Feb. 17, 2009, 57 pages, with English abstract.
Wang, W., et al. "Design and Implementation of Action Recognition System of Smart Phone Based on Acceleration Sensor," Software, 2015, vol. 36, No. 2. 4 pages, with English abstract.
Foreign Communication From a Counterpart Application, PCT Application No. PCT/CN2017/112388, English Translation of International Search Report dated Feb. 26, 2018, 2 pages.
Foreign Communication From a Counterpart Application, PCT Application No. PCT/CN2017/112388, English Translation of Written Opinion dated Feb. 26, 2018, 4 pages.
Hebei Sub-station, "Didi taxi passenger evaluation system improves service level," IT168.com, Retrieved from the Internet: http://software.it168.com/a2015/0911/1761/000001761498.shtml, Sep. 11, 2015, 4 pages.
Piji, L., et al. "Extraction and Ranking of Tags for User Opinions," Journal of Chinese Information Processing, vol. 26, No. 5, Sep. 2012, pp. 14-19. With English abstract.

* cited by examiner

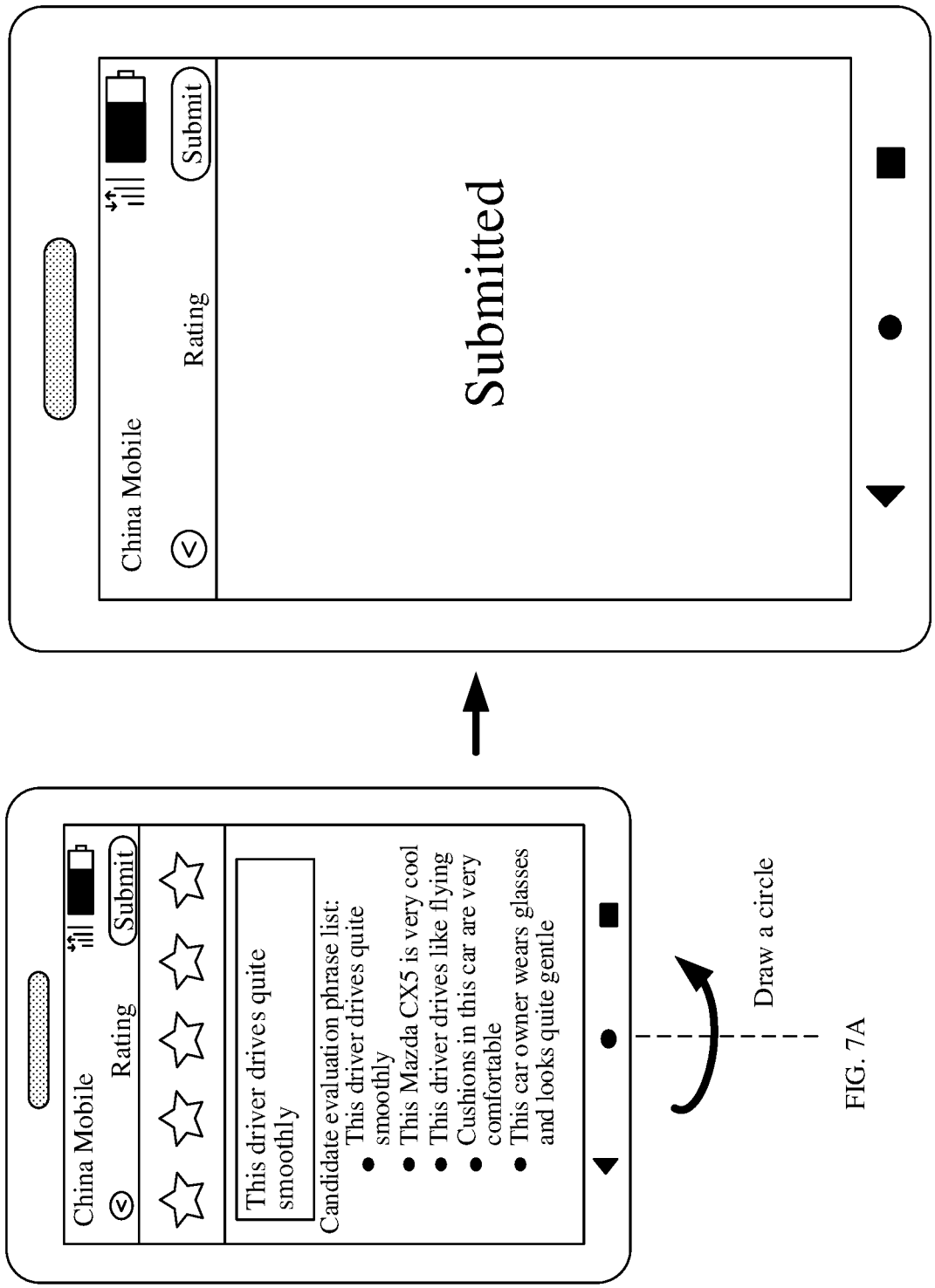

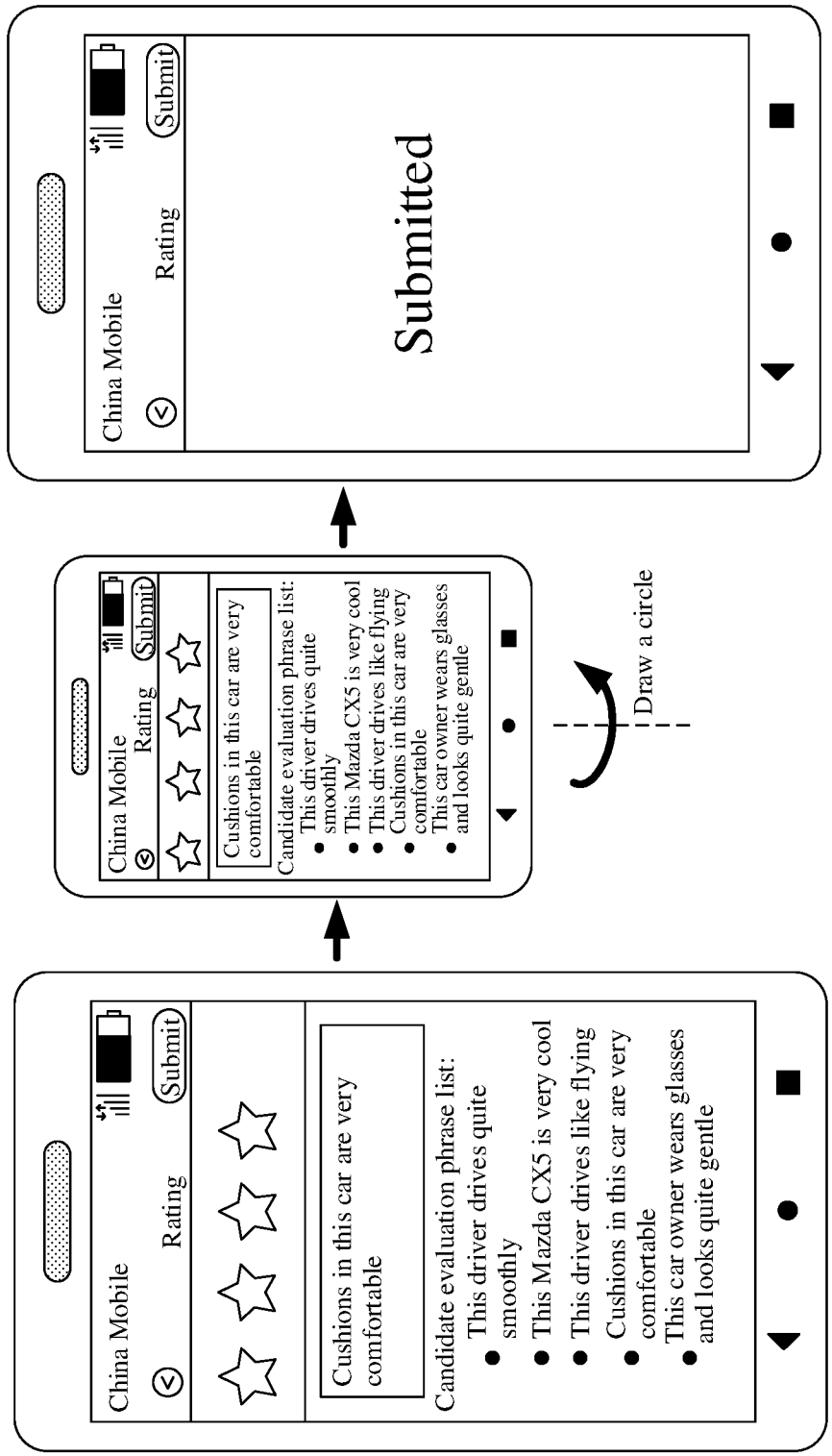

SERVICE QUALITY EVALUATION METHOD AND TERMINAL DEVICE

CROSS-REFERENCE TO RELATED APPLICATIONS

This application is a continuation application of International Patent Application No. PCT/CN2017/112388 filed on Nov. 22, 2017, which claims priority to Chinese Patent Application No. 201710193293.3 filed on Mar. 28, 2017. The disclosures of the aforementioned applications are hereby incorporated by reference in their entireties.

TECHNICAL FIELD

Embodiments of the present disclosure relate to the communications field, and in particular, to a service quality evaluation method and a terminal device.

BACKGROUND

With continuous development of communications technologies, increasingly diversified services are provided for users over the Internet. Online To Offline (O2O) is a frequently used business service mode. O2O combines offline business opportunities with the Internet and makes the Internet an offline transaction platform. In addition, with progress of mobile Internet technologies, numerous merchants roll out respective O2O applications such that the O2O can serve the merchants better.

It is well known that a value and an advantage of the O2O lie in that a user can evaluate service quality such that other users can select different serving parties according to service quality evaluation content. Therefore, after using an O2O service, the user sometimes needs to evaluate quality of an offline service using an O2O application, for example, the user needs to give a descriptive text evaluation on the service quality. In such a scenario, the user usually needs to operate a mobile phone with both hands to complete an operation such as touch, selection, tapping, or text entering. For example, a user hails a taxi using a taxi hailing application, and after the user arrives at a destination, a system automatically deducts money, and prompts the user to evaluate service quality of a car owner. In this case, when a descriptive text evaluation on the service quality needs to be provided, the user needs to operate a mobile phone with both hands to enter text in order to provide the descriptive text evaluation on the service quality. That is, in such a scenario, the user has to operate the mobile phone with both hands to complete the descriptive text evaluation on quality of an offline service. This causes low efficiency of evaluating service quality by a user.

SUMMARY

Embodiments of the present disclosure provide a service quality evaluation method and a terminal device, to resolve a problem of relatively low efficiency of evaluating service quality by a user.

To achieve the foregoing objective, the following technical solutions are used in the embodiments of the present disclosure.

According to a first aspect of the embodiments of the present disclosure, a service quality evaluation method is provided, including obtaining, by a terminal device, a candidate evaluation phrase set, where the candidate evaluation phrase set includes at least one first candidate evaluation phrase, the at least one first candidate evaluation phrase is obtained by analyzing to-be-analyzed evaluation data of a target service using a target analysis model, and the at least one first candidate evaluation phrase includes personalized information content for evaluating service quality of the target service, displaying, the at least one first candidate evaluation phrase and a first to-be-selected evaluation phrase, where the first to-be-selected evaluation phrase is the first evaluation phrase in the at least one first candidate evaluation phrase, obtaining, by the terminal device, a first moving track of the terminal device, and determining a first action type according to the first moving track, determining a target evaluation phrase between the at least one first candidate evaluation phrase and the first to-be-selected evaluation phrase according to the first action type, and sending service quality evaluation content including the target evaluation phrase.

According to the service quality evaluation method provided in this embodiment of the present disclosure, the terminal device obtains the candidate evaluation phrase set obtained by analyzing the to-be-analyzed evaluation data of the target service using the target analysis model, displays the at least one first candidate evaluation phrase included in the candidate evaluation phrase set and the first to-be-selected evaluation phrase, determines the first action type according to the obtained first moving track, determines the target evaluation phrase according to the first action type, and sends the service quality evaluation content including the target evaluation phrase. In this way, a candidate evaluation phrase and a to-be-selected evaluation phrase are displayed such that when a user needs to provide a descriptive text evaluation on quality of an offline service using an O2O application, the user can select and submit a descriptive text evaluation by performing a corresponding operation on the terminal device with only one hand, with no need to operate the terminal device with both hands to enter text. This improves efficiency of evaluating service quality by a user. In addition, both the displayed candidate evaluation phrase and to-be-selected evaluation phrase are obtained by analyzing the to-be-analyzed evaluation data of the target service using the target analysis model, and include an evaluation phrase having personalized information content for evaluating service quality of the target service. In this way, service quality evaluations submitted by users are not monotonous evaluations, but personalized, specific, and accurate service evaluations such that a requirement on diversified service quality evaluations can be met, and a more valuable reference is provided for other users to help the other users select a serving party according to service quality evaluation content. This better presents an important value and advantage of O2O.

With reference to the first aspect, in a possible implementation, when the first action type is an action type of sending the service quality evaluation content, determining, by the terminal device, a target evaluation phrase from the at least one first candidate evaluation phrase and the first to-be-selected evaluation phrase according to the first action type may include determining, by the terminal device, the first to-be-selected evaluation phrase as the target evaluation phrase according to the first action type.

With reference to the first aspect and the foregoing possible implementation, in another possible implementation, when the first action type is an action type of determining the target evaluation phrase, determining, by the terminal device, a target evaluation phrase from the at least one first candidate evaluation phrase and the first to-be-selected evaluation phrase according to the first action type may include determining, by the terminal device according to the first action type, the target evaluation phrase from evaluation phrases in the at least one first candidate evaluation phrase except the first evaluation phrase, and before sending, by the terminal device, service quality evaluation content, the service quality evaluation may further include obtaining, by the terminal device, a second moving track of the terminal device, and determining a second action type according to the second moving track, and in this case, the sending, by the terminal device, service quality evaluation content may include sending, by the terminal device, the service quality evaluation content when the second action type is an action type of sending the service quality evaluation content.

With reference to the first aspect and the foregoing possible implementations, in another possible implementation, to further improve efficiency of evaluating service quality by a user, when service quality needs to be rated, the service quality evaluation content may further include a target service score, and before obtaining, by the terminal device, a first moving track of the terminal device, and determining a first action type according to the first moving track, the service quality evaluation method may further include displaying, by the terminal device, the target service score.

With reference to the first aspect and the foregoing possible implementation, in another possible implementation, when the target service score needs to be adjusted, to further improve efficiency of evaluating service quality by a user and facilitate use for the user, after the terminal device obtains the target service score displayed by the terminal device, the service quality evaluation method may further include obtaining, by the terminal device, a third moving track of the terminal device, and determining a third action type according to the third moving track, and adjusting the target service score when determining that the third action type is an action type of adjusting a service score.

With reference to the first aspect and the foregoing possible implementations, in another possible implementation, when a candidate evaluation phrase needs to be replaced, to facilitate a user operation, the candidate evaluation phrase set may further include at least one second candidate evaluation phrase, and the service quality evaluation method may further include displaying, by the terminal device, the at least one second candidate evaluation phrase and a second to-be-selected evaluation phrase, where the second candidate evaluation phrase is obtained by analyzing the to-be-analyzed evaluation data of the target service using the target analysis model, personalized information content included in the second candidate evaluation phrase is different from that included in the first candidate evaluation phrase, and the second to-be-selected evaluation phrase is the first evaluation phrase in the at least one second candidate evaluation phrase, and obtaining, by the terminal device, a fourth moving track of the terminal device, and determining a fourth action type according to the fourth moving track, and in this case, displaying, by the terminal device, the at least one first candidate evaluation phrase, and displaying a first to-be-selected evaluation phrase may include, when the fourth action type is an action type of replacing a displayed candidate evaluation phrase, replacing, by the terminal device, the at least one second candidate evaluation phrase with the at least one first candidate evaluation phrase, and displaying the at least one first candidate evaluation phrase, and replacing the second to-be-selected evaluation phrase with the first to-be-selected evaluation phrase, and displaying the first to-be-selected evaluation phrase.

With reference to the first aspect and the foregoing possible implementations, in another possible implementation, the target analysis model is used to annotate an evaluation target, evaluation content, and other content of the to-be-analyzed evaluation data, and the candidate evaluation phrase set is obtained according to the annotated evaluation target, evaluation content, and other content of the to-be-analyzed evaluation data.

With reference to the first aspect and the foregoing possible implementations, in another possible implementation, the target analysis model is determined according to a preset model and sample data annotated using a target comment other (TCO) annotation method, and the preset model includes at least one of a conditional random field (CRF) model, a recurrent neural networks (RNN) model, or a hidden Markov model (HMM).

According to a second aspect of the embodiments of the present disclosure, a candidate evaluation phrase generation method is provided, including collecting a to-be-analyzed evaluation data set of a target service, where the to-be-analyzed evaluation data set includes a plurality of pieces of to-be-analyzed evaluation data, and the to-be-analyzed evaluation data is descriptive text data, analyzing the to-be-analyzed evaluation data set using a target analysis model in order to annotate an evaluation target, evaluation content, and other content of each piece of to-be-analyzed evaluation data included in the to-be-analyzed evaluation data set, and obtaining a candidate evaluation phrase set according to the annotated evaluation target, evaluation content, and other content of each piece of to-be-analyzed evaluation data included in the to-be-analyzed evaluation data set, where a candidate evaluation phrase included in the candidate evaluation phrase set includes personalized information content for evaluating service quality of the target service.

According to the candidate evaluation phrase generation method provided in this embodiment of the present disclosure, the collected to-be-analyzed evaluation data set is analyzed using the target analysis model in order to annotate the evaluation target, evaluation content, and other content of each piece of to-be-analyzed evaluation data included in the to-be-analyzed evaluation data set, and then the candidate evaluation phrase set is obtained according to the annotated evaluation target, evaluation content, and other content of each piece of to-be-analyzed evaluation data included in the to-be-analyzed evaluation data set. Because the candidate evaluation phrase included in the obtained candidate evaluation phrase set includes the personalized information content for evaluating the service quality of the target service, service quality evaluations submitted by users according to the candidate evaluation phrase set are not monotonous evaluations, but personalized, specific, and accurate service evaluations such that a requirement on diversified service quality evaluations can be met, and a more valuable reference is provided for other users, to help the other users select a serving party according to service quality evaluation content. This better presents an important value and advantage of O2O.

With reference to the second aspect, in another possible implementation, to ensure that a terminal device can obtain a candidate evaluation phrase, and help a user evaluate service quality, after the obtaining a candidate evaluation phrase set according to the annotated evaluation target, evaluation content, and other content of each piece of to-be-analyzed evaluation data included in the to-be-analyzed evaluation data set, the candidate evaluation phrase generation method may further include sending the candidate evaluation phrase set to the terminal device.

With reference to the second aspect and the foregoing possible implementation, in another possible implementation, to improve identification accuracy of a target analysis model, the analyzing the to-be-analyzed evaluation data set using a target analysis model in order to annotate an evaluation target, evaluation content, and other content of each piece of to-be-analyzed evaluation data included in the to-be-analyzed evaluation data set may include analyzing the to-be-analyzed evaluation data set using the target analysis model and an external feature in order to annotate the evaluation target, evaluation content, and other content of each piece of to-be-analyzed evaluation data included in the to-be-analyzed evaluation data set, where the external feature includes at least one of a target object dictionary, a dictionary of evaluation sentiment words, static N-gram, or dynamic N-gram.

With reference to the second aspect and the foregoing possible implementations, in another possible implementation, before the analyzing the to-be-analyzed evaluation data set using a target analysis model in order to annotate an evaluation target, evaluation content, and other content of each piece of to-be-analyzed evaluation data included in the to-be-analyzed evaluation data set, the candidate evaluation phrase generation method may further include obtaining a historical evaluation data set of a target service, where the historical evaluation data set includes a plurality of pieces of historical evaluation data, obtaining, from the historical evaluation data set through filtering, historical evaluation data including personalized information content, and selecting, from the historical evaluation data including the personalized information content, a preset proportion of data as sample data, annotating the sample data using a TCO annotation method in order to annotate an evaluation target, evaluation content, and other content of the sample data, determining the target analysis model according to the annotated sample data and a preset model, where the target analysis model is used to analyze to-be-analyzed evaluation data, to annotate an evaluation target, evaluation content, and other content of the to-be-analyzed evaluation data, and the preset model includes at least one of a CRF model, an RNN model, or an HMM. The target analysis model is trained using a hybrid model, ensuring both automatic identification accuracy and a recall rate.

With reference to the second aspect and the foregoing possible implementations, in another possible implementation, the obtaining a candidate evaluation phrase set according to the annotated evaluation target, evaluation content, and other content of each piece of to-be-analyzed evaluation data included in the to-be-analyzed evaluation data set may include combining, according to the annotated evaluation target, evaluation content, and other content of each piece of to-be-analyzed evaluation data included in the to-be-analyzed evaluation data set, an evaluation target and evaluation content of to-be-analyzed evaluation data to obtain a first evaluation phrase set, where the first evaluation phrase set includes at least a first evaluation phrase and a second evaluation phrase, determining a similarity between the first evaluation phrase and the second evaluation phrase using a preset method, and when the similarity between the first evaluation phrase and the second evaluation phrase is greater than a preset threshold, deleting the first evaluation phrase or the second evaluation phrase from the first evaluation phrase set, to obtain a second evaluation phrase set, where the preset method includes any one of combination word2vec model, CiLin online dictionary, or HowNet online common-sense knowledgebase, and the second evaluation phrase set includes a plurality of evaluation phrases, and sorting all evaluation phrases included in the second evaluation phrase set according to a weight of each evaluation phrase included in the second evaluation phrase set, to obtain the candidate evaluation phrase set, where the candidate evaluation phrase set includes all sorted evaluation phrases included in the second evaluation phrase set.

According to a third aspect of the embodiments of the present disclosure, a terminal device is provided, including an obtaining unit, a display unit, a determining unit, and a sending unit, where the obtaining unit is configured to obtain a candidate evaluation phrase set, where the candidate evaluation phrase set includes at least one first candidate evaluation phrase, the at least one first candidate evaluation phrase is obtained by analyzing to-be-analyzed evaluation data of a target service using a target analysis model, and the at least one first candidate evaluation phrase includes personalized information content for evaluating service quality of the target service, the display unit is configured to display the at least one first candidate evaluation phrase, and display a first to-be-selected evaluation phrase, where the first to-be-selected evaluation phrase is the first evaluation phrase in the at least one first candidate evaluation phrase, the obtaining unit is configured to obtain a first moving track of the terminal device, the determining unit is configured to determine a first action type according to the first moving track obtained by the obtaining unit, and determine a target evaluation phrase between the at least one first candidate evaluation phrase and the first to-be-selected evaluation phrase according to the first action type, and the sending unit is configured to send service quality evaluation content, where the service quality evaluation content includes the target evaluation phrase.

With reference to the third aspect, in a possible implementation, when the first action type is an action type of sending the service quality evaluation content, the determining unit is configured to determine the first to-be-selected evaluation phrase as the target evaluation phrase according to the first action type.

With reference to the third aspect and the foregoing possible implementation, in another possible implementation, when the first action type is an action type of determining the target evaluation phrase, the determining unit is configured to determine, according to the first action type, the target evaluation phrase from evaluation phrases in the at least one first candidate evaluation phrase except the first evaluation phrase, the obtaining unit is further configured to obtain a second moving track of the terminal device, the determining unit is further configured to determine a second action type according to the second moving track obtained by the obtaining unit, and the sending unit is configured to send the service quality evaluation content when the determining unit determines that the second action type is an action type of sending the service quality evaluation content.

With reference to the third aspect and the foregoing possible implementations, in another possible implementation, the service quality evaluation content further includes a target service score, and the display unit is further configured to display the target service score.

With reference to the third aspect and the foregoing possible implementation, in another possible implementation, the terminal device further includes an adjustment unit, where the obtaining unit is further configured to obtain a third moving track of the terminal device, the determining unit is further configured to determine a third action type according to the third moving track obtained by the obtaining unit, and the adjustment unit is configured to adjust the target service score when the determining unit determines that the third action type is an action type of adjusting a service score.

With reference to the third aspect and the foregoing possible implementations, in another possible implementation, the candidate evaluation phrase set further includes at least one second candidate evaluation phrase, the display unit is further configured to display the at least one second candidate evaluation phrase and a second to-be-selected evaluation phrase, where the second candidate evaluation phrase is obtained by analyzing the to-be-analyzed evaluation data of the target service using the target analysis model, personalized information content included in the second candidate evaluation phrase is different from that included in the first candidate evaluation phrase, and the second to-be-selected evaluation phrase is the first evaluation phrase in the at least one second candidate evaluation phrase, the obtaining unit is further configured to obtain a fourth moving track of the terminal device, the determining unit is further configured to determine a fourth action type according to the fourth moving track obtained by the obtaining unit, and the display unit is configured to, when the determining unit determines that the fourth action type is an action type of replacing a displayed candidate evaluation phrase, replace the at least one second candidate evaluation phrase with the at least one first candidate evaluation phrase, and display the at least one first candidate evaluation phrase, and replace the second to-be-selected evaluation phrase with the first to-be-selected evaluation phrase, and display the first to-be-selected evaluation phrase.

With reference to the third aspect and the foregoing possible implementations, in another possible implementation, the target analysis model is used to annotate an evaluation target, evaluation content, and other content of the to-be-analyzed evaluation data, and the candidate evaluation phrase set is obtained according to the annotated evaluation target, evaluation content, and other content of the to-be-analyzed evaluation data.

With reference to the third aspect and the foregoing possible implementations, in another possible implementation, the target analysis model is determined according to a preset model and sample data annotated using a TCO annotation method, and the preset model includes at least one of a CRF model, an RNN model, or an HMM.

According to a fourth aspect of the embodiments of the present disclosure, a candidate evaluation phrase generation apparatus is provided, including a collection unit, an analysis unit, and an obtaining unit, where the collection unit is configured to collect a to-be-analyzed evaluation data set of a target service, where the to-be-analyzed evaluation data set includes a plurality of pieces of to-be-analyzed evaluation data, and the to-be-analyzed evaluation data is descriptive text data, the analysis unit is configured to analyze, using a target analysis model, the to-be-analyzed evaluation data set collected by the collection unit in order to annotate an evaluation target, evaluation content, and other content of each piece of to-be-analyzed evaluation data included in the to-be-analyzed evaluation data set, and the obtaining unit is configured to obtain a candidate evaluation phrase set according to the evaluation target, evaluation content, and other content of each piece of to-be-analyzed evaluation data included in the to-be-analyzed evaluation data set that are annotated by the analysis unit, where a candidate evaluation phrase included in the candidate evaluation phrase set includes personalized information content for evaluating service quality of the target service.

With reference to the fourth aspect, in a possible implementation, the candidate evaluation phrase generation apparatus further includes a sending unit, where the sending unit is configured to send the candidate evaluation phrase set obtained by the obtaining unit to a terminal device.

With reference to the fourth aspect and the foregoing possible implementation, in another possible implementation, the analysis unit is configured to analyze the to-be-analyzed evaluation data set using the target analysis model and an external feature in order to annotate the evaluation target, evaluation content, and other content of each piece of to-be-analyzed evaluation data included in the to-be-analyzed evaluation data set, where the external feature includes at least one of the following a target object dictionary, a dictionary of evaluation sentiment words, static N-gram, or dynamic N-gram.

With reference to the fourth aspect and the foregoing possible implementations, in another possible implementation, the candidate evaluation phrase generation apparatus further includes a selection unit, an annotation unit, and a determining unit, where the obtaining unit is further configured to obtain a historical evaluation data set of a target service, where the historical evaluation data set includes a plurality of pieces of historical evaluation data, the selection unit is configured to obtain, through filtering from the historical evaluation data set obtained by the obtaining unit, historical evaluation data including personalized information content, and select, from the historical evaluation data including the personalized information content, a preset proportion of data as sample data, the annotation unit is configured to annotate, using a TCO annotation method, the sample data obtained by the selection unit in order to annotate an evaluation target, evaluation content, and other content of the sample data, and the determining unit is configured to determine a target analysis model according to a preset model and the sample data annotated by the annotation unit, where the target analysis model is used to analyze to-be-analyzed evaluation data, to annotate an evaluation target, evaluation content, and other content of the to-be-analyzed evaluation data, and the preset model includes at least one of a CRF model, an RNN model, or an HMM.

With reference to the fourth aspect and the foregoing possible implementations, in another possible implementation, the obtaining unit is further configured to combine, according to the annotated evaluation target, evaluation content, and other content of each piece of to-be-analyzed evaluation data included in the to-be-analyzed evaluation data set, an evaluation target and evaluation content of to-be-analyzed evaluation data to obtain a first evaluation phrase set, where the first evaluation phrase set includes at least a first evaluation phrase and a second evaluation phrase, determine a similarity between the first evaluation phrase and the second evaluation phrase using a preset method, and when the similarity between the first evaluation phrase and the second evaluation phrase is greater than a preset threshold, delete the first evaluation phrase or the second evaluation phrase from the first evaluation phrase set to obtain a second evaluation phrase set, where the preset method includes any one of combination word2vec, or HowNet, and the second evaluation phrase set includes a plurality of evaluation phrases, and sort all evaluation phrases included in the second evaluation phrase set according to a weight of each evaluation phrase included in the second evaluation phrase set to obtain a candidate evaluation phrase set, where the candidate evaluation phrase set includes all sorted evaluation phrases included in the second evaluation phrase set.

According to a fifth aspect of the embodiments of the present disclosure, a terminal device is provided, where the terminal device may include at least one processor, a memory, and a display, where the memory is configured to store a computer software instruction, the display is configured to display at least one first candidate evaluation phrase, where the first candidate evaluation phrase includes personalized information content for evaluating service quality of a target service, and the processor is configured to invoke the computer software instruction stored in the memory, to perform the steps of obtaining a first moving track of the terminal device, and determining a first action type according to the first moving track, determining a target evaluation phrase from the at least one first candidate evaluation phrase when determining that the first action type is an action type of determining the target evaluation phrase, obtaining a second moving track of the terminal device, and determining a second action type according to the second moving track, and sending the service quality evaluation content including the target evaluation phrase when the second action type is an action type of sending service quality evaluation content.

According to a sixth aspect of the embodiments of the present disclosure, a candidate evaluation phrase generation apparatus is provided, where the candidate evaluation phrase generation apparatus includes at least one processor, a memory, a communications interface, and a communications bus, the at least one processor is connected to the memory and the communications interface using the communications bus, the memory is configured to store a computer software instruction, and when the candidate evaluation phrase generation apparatus runs, the processor executes the computer software instruction stored in the memory, to enable the candidate evaluation phrase generation apparatus to execute the candidate evaluation phrase generation method according to any one of the second aspect or the possible implementations of the second aspect.

According to a seventh aspect of the embodiments of the present disclosure, a computer storage medium is provided and configured to store a computer software instruction used by the foregoing terminal device, where the computer software instruction includes a program designed to execute the foregoing service quality evaluation method.

According to an eighth aspect of the embodiments of the present disclosure, a computer storage medium is provided and configured to store a computer software instruction used by the foregoing candidate evaluation phrase generation apparatus, where the computer software instruction includes a program designed to execute the foregoing candidate evaluation phrase generation method.

BRIEF DESCRIPTION OF DRAWINGS

FIG. 7A is a schematic diagram of another scenario in which a service quality evaluation method in an embodiment of the present disclosure is used according to embodiments of the present disclosure;

FIG. 7B is a schematic diagram of another scenario in which a service quality evaluation method in an embodiment of the present disclosure is used according to embodiments of the present disclosure;

FIG. 11A is a schematic diagram of another scenario in which a service quality evaluation method in an embodiment of the present disclosure is used according to embodiments of the present disclosure;

FIG. 11B is a schematic diagram of another scenario in which a service quality evaluation method in an embodiment of the present disclosure is used according to embodiments of the present disclosure;

FIG. 11C is a schematic diagram of another scenario in which a service quality evaluation method in an embodiment of the present disclosure is used according to embodiments of the present disclosure;

DESCRIPTION OF EMBODIMENTS

When a user needs to evaluate quality of an offline service using an O2O application, to resolve a problem of relatively low efficiency of evaluating the service quality by the user, the embodiments of the present disclosure provide a service quality evaluation method. A basic principle of the method is that a terminal device obtains a candidate evaluation phrase set, where the candidate evaluation phrase set includes at least one first candidate evaluation phrase, the at least one first candidate evaluation phrase is obtained by analyzing to-be-analyzed evaluation data of a target service using a target analysis model, and the at least one first candidate evaluation phrase includes personalized information content for evaluating service quality of the target service, the terminal device displays the at least one first candidate evaluation phrase and a first to-be-selected evaluation phrase, where the first to-be-selected evaluation phrase is the first evaluation phrase in the at least one first candidate evaluation phrase, and the terminal device obtains a first moving track of the terminal device, determines a first action type according to the first moving track, determines a target evaluation phrase from the at least one first candidate evaluation phrase and the first to-be-selected evaluation phrase according to the first action type, and sends service quality evaluation content including the target evaluation phrase. In this way, a candidate evaluation phrase and a to-be-selected evaluation phrase are displayed such that when the user needs to provide a descriptive text evaluation on the quality of the offline service using the O2O application, the user can select and submit the descriptive text evaluation by performing a corresponding operation on the terminal device with only one hand, with no need to operate the terminal device with both hands to enter text. This improves efficiency of evaluating service quality by a user. In addition, both the displayed candidate evaluation phrase and to-be-selected evaluation phrase are obtained by analyzing the to-be-analyzed evaluation data of the target service using the target analysis model, and include an evaluation phrase having personalized information content for evaluating service quality of the target service. In this way, service quality evaluations submitted by users are not monotonous evaluations, but personalized, specific, and accurate service evaluations such that a requirement on diversified service quality evaluations can be met, and a more valuable reference is provided for other users, to help the other users select a serving party according to service quality evaluation content. This better presents an important value and advantage of O2O.

The following details implementations of the embodiments of the present disclosure with reference to accompanying drawings.

Figure 1:
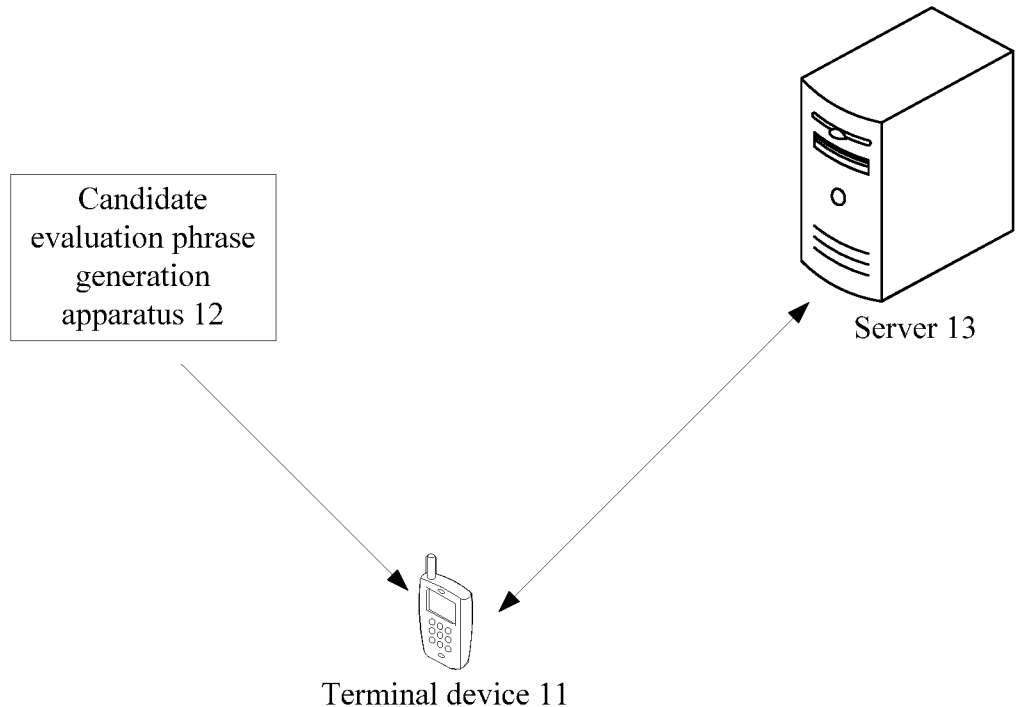
FIG. 1 is a simplified schematic diagram of a system architecture to which an embodiment of the present disclosure is applied according to embodiments of the present disclosure.

FIG. 1 is a simplified schematic diagram of a system architecture to which an embodiment of the present disclosure is applied. As shown in FIG. 1, the system architecture may include a terminal device 11, a candidate evaluation phrase generation apparatus 12, and a server 13.

During specific implementation, the terminal device 11 may be a desktop computer, a laptop computer, a tablet computer, a handheld computer, a mobile phone, a notebook computer, an ultra-mobile personal computer (UMPC), a netbook, a cellular phone, a personal digital assistant (PDA), a dedicated media player, a consumer electronic device, a wearable device, a smartwatch, smart glasses, a Pad, or the like. In an embodiment, as shown in FIG. 1, the terminal device 11 included in a network architecture in the present disclosure is a mobile phone. In this embodiment of the present disclosure, the terminal device 11 is mainly configured to display a candidate evaluation phrase, select a target evaluation phrase according to an operation performed by a user on the terminal device, and submit service quality evaluation content.

In this embodiment of the present disclosure, the candidate evaluation phrase generation apparatus 12 is configured to generate a candidate evaluation phrase set, and send the candidate evaluation phrase set to the terminal device 11 such that a user can select a candidate evaluation phrase. The candidate evaluation phrase generation apparatus 12 may be implemented using a computer device (or system). During specific implementation, the candidate evaluation phrase generation apparatus 12 may generate the candidate evaluation phrase set using two methods. Method 1 is to use a specified rule to generate the candidate evaluation phrase set, and method 2 is to use a machine learning method in a candidate evaluation phrase generation method provided in the embodiments of the present disclosure to perform automatic extraction to generate the candidate evaluation phrase set. Certainly, the candidate evaluation phrase generation apparatus 12 may generate the candidate evaluation phrase set using the foregoing two methods separately or using the foregoing two methods together.

In this embodiment of the present disclosure, the server 13 is configured to receive and store service quality evaluation content submitted by a user using the terminal device 11.

It should be noted that the candidate evaluation phrase generation apparatus 12 may be independently deployed, or may be integrated into the server 13. In this embodiment of the present disclosure, for example, the candidate evaluation phrase generation apparatus 12 is independently deployed in FIG. 1.

Figure 2:
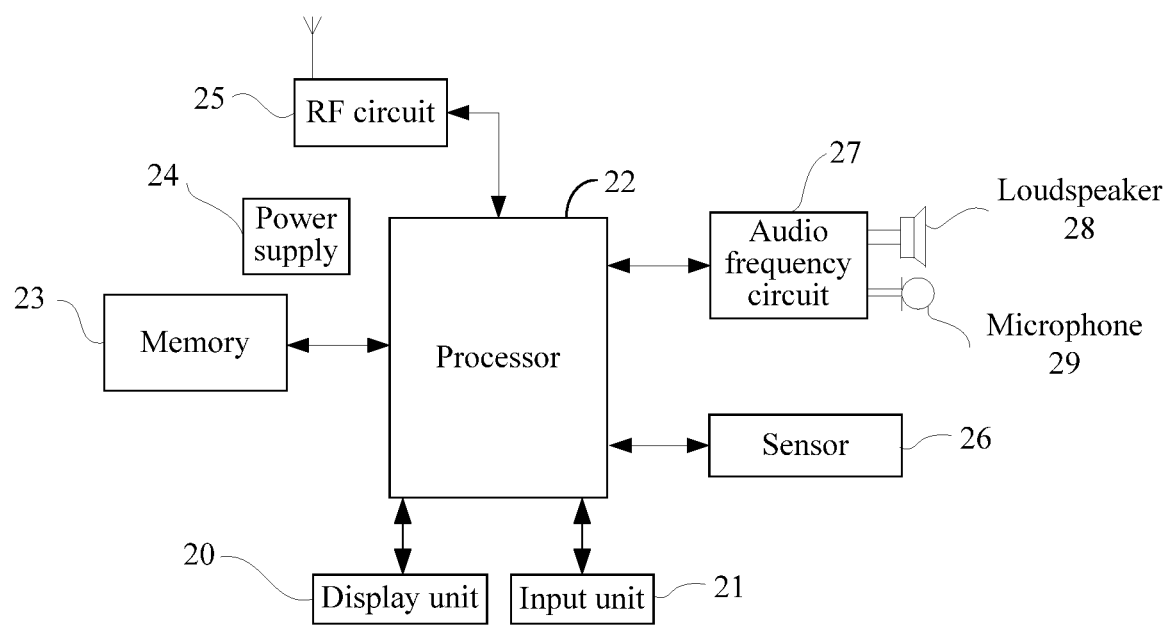
FIG. 2 is a schematic composition diagram of a terminal device according to an embodiment of the present disclosure.

FIG. 2 is a schematic composition diagram of a terminal device according to an embodiment of the present disclosure. As shown in FIG. 2, for example, the terminal device is a mobile phone. The following describes each constituent component of the mobile phone with reference to the accompanying drawings.

As shown in FIG. 2, the mobile phone may include components such as a display unit 20, an input unit 21, a processor 22, a memory 23, a power supply 24, a radio frequency (RF) circuit 25, a gravity sensor 26, an audio frequency circuit 27, a loudspeaker 28, and a microphone 29. These components may be connected using buses, or may be directly connected. A person skilled in the art may understand that a structure of the mobile phone shown in FIG. 2 constitutes no limitation on the mobile phone, and the mobile phone may include components more or fewer than those shown in this figure, or a combination of some components, or components disposed differently.

The display unit 20 may be connected to the processor 22 in an operable manner, and is configured to receive and display a processing result returned by the processor 22. For example, the display unit 20 may be configured to display an image collected by a camera and various menus of the mobile phone. A graphical user interface (GUI) is usually configured on the display unit 20, and the GUI is configured to provide an easy-to-use interface between a user and an operating system that runs on the mobile phone. In this embodiment of the present disclosure, when a user needs to use an O2O application to evaluate service quality after using an O2O service such as taxi hailing, shopping, or a game, the display unit 20 may be used to display an evaluation screen. The evaluation screen may include a candidate evaluation phrase, a displayed service score, and the like, to help the user evaluate the service quality. Certainly, prompt information may also be displayed, to prompt the user that the user can perform an action, for example, shaking the mobile phone, to adjust a service score, select a target evaluation phrase, replace a candidate evaluation phrase, submit service quality evaluation content, or the like. Certainly, the user may use the service quality evaluation method provided in this embodiment of the present disclosure to automatically evaluate service quality, and may select a process of manually entering a descriptive text evaluation, manually tapping to score, manually submitting service quality evaluation content, or the like. The method provided in this embodiment of the present disclosure does not conflict with a process of manually evaluating service quality.

The input unit 21 may be a single-point or multipoint input unit. The input unit 21 may be connected to the processor 22 in an operable manner, and is configured to receive an input operation of the user. The input unit 21 may be a touchpad or a touchscreen placed on or in front of the display unit 20. The touchpad or the touchscreen can collect a touch operation of the user on or near the touchpad or the touchscreen (for example, an operation that the user performs on or near the touchscreen using any suitable object or accessory such as a finger or a stylus), and drive a corresponding connection apparatus according to a preset program. For example, the touchpad or the touchscreen may be implemented based on a sensing technology such as a capacitive sensing technology, a resistive sensing technology, a surface acoustic wave sensing technology, a pressure sensing technology, or an optical sensing technology. In addition, the touchpad or the touchscreen may be integrated with the display unit 20, or may be an independent component.

The processor 22 is a control center of the mobile phone, and connects various components of the entire mobile phone using various interfaces and lines. The processor 22 executes various functions of the mobile phone and processes data by running or executing a software program and/or module stored in the memory 23, and invoking data stored in the memory 23 in order to monitor the entire mobile phone. During specific implementation, in an embodiment, the processor 22 may include one or more processing units. An application processor and a modem processor may be integrated into the processor 22. The application processor mainly processes an operating system, a user interface, an application program, and the like. The modem processor mainly processes wireless communication. It can be understood that the foregoing modem processor may not be integrated into the processor 22. In this embodiment of the present disclosure, the processor 22 is configured to determine an action type according to a moving track of the mobile phone, and perform different operations according to different action types, for example, determining a target evaluation phrase.

The memory 23 may be configured to store data, a software program, and a module, and may be a volatile memory, for example, a random access memory (RAM), or a non-volatile memory, for example, a read-only memory (ROM), a flash memory, a hard disk drive (HDD), or a solid-state drive (SSD), or a combination of the foregoing types of memories. Alternatively, the memory 23 may be a removable storage medium, for example, a secure digital (SD) storage card. Further, the memory 23 may store program code. The program code is used to enable the processor 22 to execute the program code to execute a message combining and displaying method provided in this embodiment of the present disclosure. In this embodiment of the present disclosure, the memory 23 may be configured to store a candidate evaluation phrase set. Certainly, the memory 23 may pre-store correspondences between different action types and operations. For example, an action type is shaking up and down, and a corresponding operation is determining a target evaluation phrase. A specific correspondence may be set according to a requirement of an actual application scenario.

The power supply 24 may be a battery, and is logically connected to the processor 22 using a power supply management system in order to implement functions of charging management, discharging management, power consumption management, and the like using the power supply management system.

The RF circuit 25 may be configured to receive and send information, or receive and send a signal during a call, and particularly, send received information to the processor 22 for processing, and send a signal generated by the processor 22. Generally, the RF circuit includes but is not limited to an antenna, at least one amplifier, a transceiver, a coupler, a low noise amplifier (LNA), a duplexer, and the like. In addition, the RF circuit 25 may also communicate with a network and other devices through wireless communication. In this embodiment of the present disclosure, the RF circuit 25 may communicate with a server in order to transmit records of chats with another user terminal, obtain coordinated universal time, and the like.

The sensor 26 may be a sensor, for example, a gravity sensor, a pressure sensor, an optical sensor, a gyroscope, an acceleration sensor, a barometer, a hygrometer, a thermometer, or an infrared sensor. This is not limited herein. For example, the gravity sensor may detect a magnitude of acceleration of the mobile phone in all directions (generally three axes), may detect a magnitude and direction of gravity when being still, and may be used in an application identifying a mobile phone posture (for example, switch between a landscape orientation and a portrait orientation, a related game, or a magnetometer posture calibration), a vibration identification-related function (for example, a pedometer or stroking), and the like. In this embodiment of the present disclosure, the acceleration sensor, the gyroscope, or the gravity sensor may be used to capture a moving track of the mobile phone, for example, upward and downward shaking, leftward and rightward shaking, and flipping.

The audio frequency circuit 27, the loudspeaker 28, and the microphone 29 may provide an audio interface between the user and the mobile phone. The audio frequency circuit 27 may transmit an electrical signal converted from received audio data to the loudspeaker 28, and the loudspeaker 28 converts the electrical signal into an acoustic signal and outputs the acoustic signal. In addition, the microphone 29 converts a collected acoustic signal into an electrical signal, and the audio frequency circuit 27 receives the electrical signal, converts the electrical signal into audio data, and outputs the audio data to the RF circuit 25 in order to send the audio data to, for example, another mobile phone, or outputs the audio data to the processor 22 for further processing.

In addition, an operating system runs on the foregoing components. An application program, such as an O2O application, may be installed or may run in the operating system. In addition, although not shown, the mobile phone may further include a component such as a WI-FI module, a BLUETOOTH module, or a camera. The WI-FI module may be a module including a WI-FI chip and a WI-FI chip driver, and the WI-FI chip is capable of running a wireless Internet standard protocol. The BLUETOOTH module is a printed circuit board assembly (PCBA) on which a BLUETOOTH function is integrated, and is configured to perform short-distance wireless communication.

Figure 3:
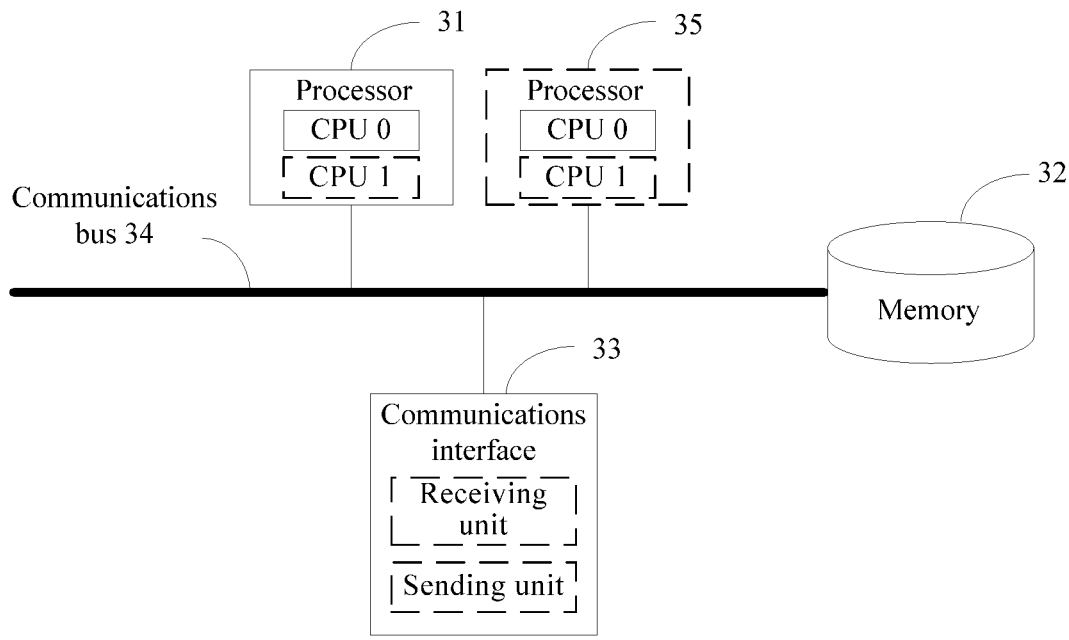
FIG. 3 is a schematic composition diagram of a candidate evaluation phrase generation apparatus according to an embodiment of the present disclosure.

FIG. 3 is a schematic composition diagram of a candidate evaluation phrase generation apparatus according to an embodiment of the present disclosure. As shown in FIG. 3, for example, the candidate evaluation phrase generation apparatus is implemented using a computer device. Each constituent component of the candidate evaluation phrase generation apparatus is further described based on the example. The candidate evaluation phrase generation apparatus may include at least one processor 31, a memory 32, a communications interface 33, and a communications bus 34.

The following further describes each constituent component of the candidate evaluation phrase generation apparatus with reference to FIG. 3.

The processor 31 is a control center of the candidate evaluation phrase generation apparatus, and may be a processor, or may be a general term of a plurality of processing elements. For example, the processor 31 may be a central processing unit (CPU), may be an application specific integrated circuit (ASIC), or may be configured as one or more integrated circuits for implementing this embodiment of the present disclosure, for example, one or more microprocessors (digital signal processor (DSP)) or one or more field programmable gate array (FPGA).

The processor 31 may run or execute a software program stored in the memory 32 and invoke data stored in the memory 32, to implement various functions of the candidate evaluation phrase generation apparatus.

During specific implementation, in an embodiment, the processor 31 may include one or more CPUs, for example, a CPU0 and a CPU1 in FIG. 3.

During specific implementation, in an embodiment, the candidate evaluation phrase generation apparatus may include a plurality of processors, for example, the processor 31 and a processor 35 in FIG. 3. Each of the processors may be a single-core processor, or may be a multi-core processor. The processor herein may be one or more devices, circuits, and/or processing cores used for processing data (for example, computer program instructions).

The memory 32 may be a ROM or another type of static storage device that can store static information and instructions, a RAM or another type of dynamic storage device that can store information and instructions, an electrically erasable programmable ROM (EEPROM), a compact disc (CD) ROM (CD-ROM) or another optical disk storage, an optical disc storage (including a CD, a laser disc, an optical disc, a digital versatile disc (DVD), a BLU-RAY optical disc, and the like), a magnetic disk storage medium or another magnetic storage device, or any other computer-accessible medium that can be used to carry or store expected program code in an instruction or data structure form, without being limited thereto though. The memory 32 may exist independently, and is connected to the processor 31 using the communications bus 34, or the memory 32 may be integrated with the processor 31.

The memory 32 is configured to store and execute a software program corresponding to a solution of the present disclosure, and the processor 31 controls the execution.

The communications interface 33 uses any transceiver-like apparatus to communicate with another device or a communications network, for example, the Ethernet, a radio access network (RAN), or a wireless local area networks (WLAN). The communications interface 33 may include a receiving unit configured to implement a receiving function and a sending unit configured to implement a sending function.

The communications bus 34 may be an industry standard architecture (ISA) bus, a peripheral component interconnect (PCI) bus, an extended ISA (EISA) bus, or the like. The bus may be classified into an address bus, a data bus, a control bus, and the like. For ease of representation, the bus is represented using only one bold line in FIG. 3. However, this does not mean that there is only one bus or one type of bus.

The device structure shown in FIG. 3 constitutes no limitation on the candidate evaluation phrase generation apparatus, and the candidate evaluation phrase generation apparatus may include components more or fewer than those shown in this figure, a combination of some components, or components disposed differently.

Figure 4:
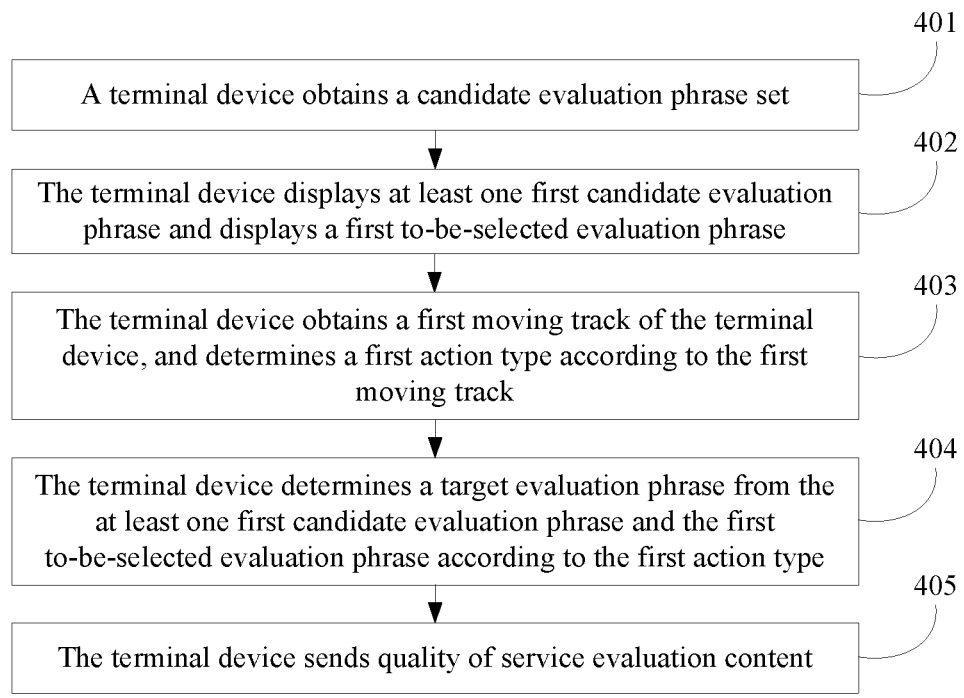
FIG. 4 is a flowchart of a service quality evaluation method according to an embodiment of the present disclosure.

FIG. 4 is a flowchart of a service quality evaluation method according to an embodiment of the present disclosure. As shown in FIG. 4, the method may include the following steps.

Step 401. A terminal device obtains a candidate evaluation phrase set.

The candidate evaluation phrase set includes at least one first candidate evaluation phrase, the at least one first candidate evaluation phrase is obtained by analyzing to-be-analyzed evaluation data of a target service using a target analysis model, and the at least one first candidate evaluation phrase includes personalized information content for evaluating service quality of the target service.

Step 402. The terminal device displays at least one first candidate evaluation phrase and displays a first to-be-selected evaluation phrase.

Optionally, the first to-be-selected evaluation phrase may be the first candidate evaluation phrase in at least one candidate evaluation phrase, or may be first several candidate evaluation phrases in the at least one candidate evaluation phrase.

For example, when a user needs to evaluate service quality using an O2O application, for example, when the user needs to evaluate, after hailing a taxi, service quality of a taxi owner using taxi hailing software, or when the user needs to evaluate, after a service is handled at a service window of an enterprise or a public institution, service quality staff using a corresponding O2O application, and the O2O application is started, the terminal device may display an evaluation screen. An input box on the evaluation screen may display a first to-be-selected evaluation phrase, and at least one first candidate evaluation phrase may be displayed below the input box.

Step 403. The terminal device obtains a first moving track of the terminal device, and determines a first action type according to the first moving track.

After the terminal device displays the at least one first candidate evaluation phrase and the first to-be-selected evaluation phrase, the user may perform a first operation on the terminal device when determining that the displayed evaluation phrase may be used as an evaluation that the user needs to provide. In this case, the terminal device can obtain the first moving track of the terminal device, and determine an action type of the first operation performed by the user, that is, the first action type.

For example, when the first operation is drawing a circle, the first action type determined by the terminal device according to the first moving track captured by an acceleration sensor or a gyroscope is drawing a circle.

Step 404. The terminal device determines a target evaluation phrase from the at least one first candidate evaluation phrase and the first to-be-selected evaluation phrase according to the first action type.

The target evaluation phrase may be the first to-be-selected evaluation phrase, or may be one or more evaluation phrases determined from evaluation phrases in the at least one first candidate evaluation phrase except the first evaluation phrase according to the user operation.

Step 405. The terminal device sends service quality evaluation content.

The service quality evaluation content includes the target evaluation phrase. After the terminal device determines the target evaluation phrase, the terminal device may add the target evaluation phrase to the service quality evaluation content, and send the service quality evaluation content to the server.

According to the service quality evaluation method provided in this embodiment of the present disclosure, the terminal device obtains the candidate evaluation phrase set obtained by analyzing the to-be-analyzed evaluation data of the target service using the target analysis model, displays the at least one first candidate evaluation phrase included in the candidate evaluation phrase set and the first to-be-selected evaluation phrase, determines the first action type according to the obtained first moving track, determines the target evaluation phrase according to the first action type, and sends the service quality evaluation content including the target evaluation phrase. In this way, a candidate evaluation phrase and a to-be-selected evaluation phrase are displayed such that when a user needs to provide a descriptive text evaluation on quality of an offline service using an O2O application, the user can select and submit the descriptive text evaluation by performing a corresponding operation on the terminal device with only one hand, with no need to operate the terminal device with both hands to enter text. This improves efficiency of evaluating service quality by a user. In addition, both the displayed candidate evaluation phrase and to-be-selected evaluation phrase are obtained by analyzing the to-be-analyzed evaluation data of the target service using the target analysis model, and include an evaluation phrase having personalized information content for evaluating service quality of the target service. In this way, service quality evaluations submitted by users are not monotonous evaluations, but personalized, specific, and accurate service evaluations such that a requirement on diversified service quality evaluations can be met, and a more valuable reference is provided for other users, to help the other users select a serving party according to service quality evaluation content. This better presents an important value and advantage of O2O.

Figure 5:
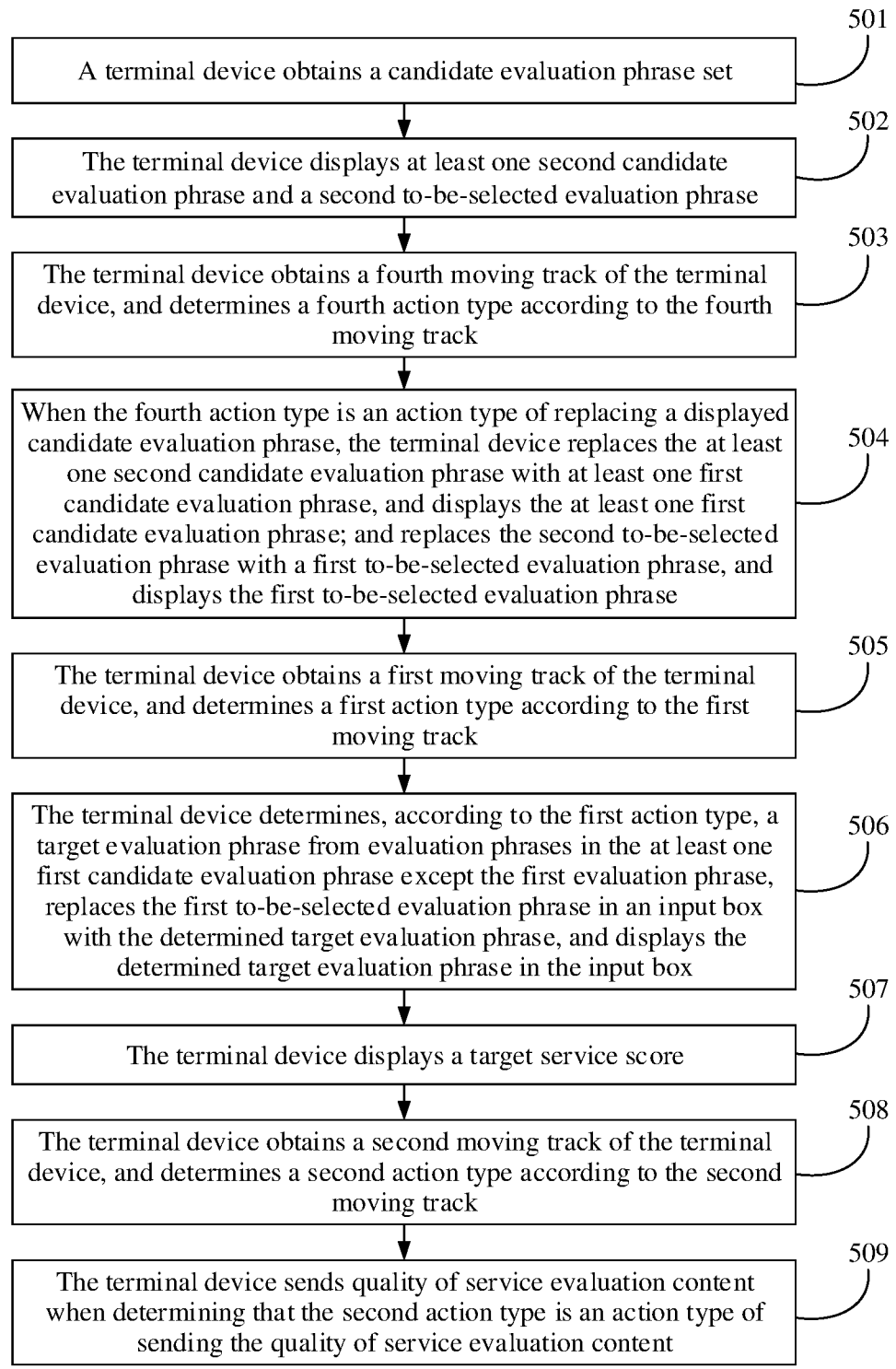
FIG. 5 is a flowchart of another service quality evaluation method according to an embodiment of the present disclosure.

FIG. 5 is a flowchart of another service quality evaluation method according to an embodiment of the present disclosure. As shown in FIG. 5, the method may include the following steps.

Step 501. A terminal device obtains a candidate evaluation phrase set.

For example, when a user needs to evaluate service quality using an O2O application, to avoid low evaluation efficiency and inconvenience caused by manual entering of a descriptive text evaluation, the terminal device can obtain the candidate evaluation phrase set available for the user in this embodiment of the present disclosure. In this embodiment of the present disclosure, the terminal device may use the following two manners to obtain the candidate evaluation phrase set.

Manner 1. The terminal device obtains a pre-stored candidate evaluation phrase set.

A user may manually pre-store the candidate evaluation phrase set in a memory of the terminal device such that the terminal device can obtain the candidate evaluation phrase set from the memory of the terminal device when needed.

Further, optionally, the terminal device may automatically store historical evaluation content of a user into a memory of the terminal device as the candidate evaluation phrase set. Alternatively, a server may collect historical evaluation content of a user, and send the historical evaluation content of the user to the terminal device such that the terminal device stores the historical evaluation content of the user into a memory of the terminal device as the candidate evaluation phrase set.

Manner 2. The terminal device receives a candidate evaluation phrase set sent by a candidate evaluation phrase generation apparatus.

In this embodiment of the present disclosure, the candidate evaluation phrase generation apparatus is an apparatus configured to generate a candidate evaluation phrase set. After generating a candidate evaluation phrase set, the candidate evaluation phrase generation apparatus may send the candidate evaluation phrase set to the terminal device. In this case, the terminal device can receive the candidate evaluation phrase set sent by the candidate evaluation phrase generation apparatus. Certainly, after receiving the candidate evaluation phrase set, the terminal device can store the candidate evaluation phrase set into the memory of the terminal device in order to obtain the candidate evaluation phrase set from the memory of the terminal device when needed.

It should be noted that in this embodiment of the present disclosure, the candidate evaluation phrase set may include a plurality of candidate evaluation phrases, each candidate evaluation phrase includes personalized information content for evaluating service quality of a target service, different candidate evaluation phrases include different personalized information content for evaluating the service quality of the target service, and a sequence of the plurality of candidate evaluation phrases may be a sequence obtained through weight-based sorting. The plurality of candidate evaluation phrases include a first candidate evaluation phrase and a second candidate evaluation phrase. Both the first candidate evaluation phrase and the second candidate evaluation phrase are obtained by analyzing to-be-analyzed evaluation data of a target service using a target analysis model, and the first candidate evaluation phrase and the second candidate evaluation phrase are only to distinguish between different batches of candidate evaluation phrases displayed on the terminal device.

In addition, in this embodiment of the present disclosure, candidate evaluation phrase sets for different services are different. To ensure that corresponding candidate evaluation phrases can be provided for a user according to different services, different identifiers may be allocated to the candidate evaluation phrase sets for the different services in advance. The identifiers may be identifiers of target services. In this way, when a user needs to evaluate service quality of a target service, the terminal device can obtain a corresponding candidate evaluation phrase set according to an identifier of the target service. In addition, in this embodiment of the present disclosure, the target analysis model is used to annotate an evaluation target, evaluation content, and other content of to-be-analyzed evaluation data, and the candidate evaluation phrase set is obtained according to the annotated evaluation target, evaluation content, and other content of the to-be-analyzed evaluation data. In this embodiment of the present disclosure, the target analysis model is determined according to a preset model and sample data annotated using a TCO annotation method, and the preset model may further include at least one of a CRF model, an RNN model, or an HMM.

Step 502. The terminal device displays at least one second candidate evaluation phrase and a second to-be-selected evaluation phrase.

When a user needs to evaluate service quality of a target service using an O2O application, the terminal device may select a batch of candidate evaluation phrases from an obtained candidate evaluation phrase set (the candidate evaluation phrase set is a candidate evaluation phrase set corresponding to an identifier of the target service), that is, at least one candidate evaluation phrase that needs to be displayed is selected as a second candidate evaluation phrase, use, as a second to-be-selected evaluation phrase, the first evaluation phrase in the at least one second candidate evaluation phrase, and display the at least one second candidate evaluation phrase and the second to-be-selected evaluation phrase for the user to select.

The second to-be-selected evaluation phrase may be filled in an input box on a display screen, and the at least one second candidate evaluation phrase may be displayed next to the input box. Optionally, a display color of a to-be-selected evaluation phrase may be grey, to prompt the user that the second to-be-selected evaluation phrase is a recommended target evaluation phrase. In addition, when the user wants to manually enter an evaluation phrase, the user can tap any location in the input box. In this case, an evaluation phrase filled in the input box disappears automatically.

For example, one or more second candidate evaluation phrases may be displayed on the terminal device. A specific quantity of displayed second candidate evaluation phrases may be preset, or may be determined by the terminal device according to an actual application scenario.

When selecting a candidate evaluation phrase that needs to be displayed, the terminal device may randomly select, from the candidate evaluation phrase set, a preset quantity of candidate evaluation phrases as second candidate evaluation phrases, or may select, from the candidate evaluation phrase set, a preset quantity of candidate evaluation phrases as second candidate evaluation phrases according to a specific rule, for example, in an ascending order when a plurality of candidate evaluation phrases included in the candidate evaluation phrase set are sorted according to a weight.

It should be noted that the quantity of displayed second candidate evaluation phrases and a rule of selecting the candidate evaluation phrase that needs to be displayed are not limited herein in this embodiment of the present disclosure, and may be set according to a requirement of an actual application scenario.

After the terminal device displays the second candidate evaluation phrase and the second to-be-selected evaluation phrase, the user can perform a corresponding operation on the terminal device. In this case, the terminal device can capture a moving track of the terminal device, and make a corresponding response according to an action type (the action type is an action type of the operation performed by the user) determined according to the moving track. That is, after the terminal device displays the second candidate evaluation phrase and the second to-be-selected evaluation phrase, the terminal device may make the corresponding response according to the action type of the operation performed by the user on the terminal device.

It should be noted that in this embodiment of the present disclosure, a correspondence between the action type of the operation performed by the user on the terminal device and a response of the terminal device may be preset in the terminal device, and a specific correspondence between the action type of the operation performed by the user on the terminal device and the response of the terminal device may be set according to a requirement of an actual application scenario, and this is not limited herein in this embodiment of the present disclosure. In addition, a specific response that may be made by the terminal device to a specific action type may be notified to the user in advance such that the user can perform an operation on the terminal device according to a requirement of the user, and the terminal device makes a response required by the user.

For example, when the user considers that an evaluation phrase filled in the input box (that is, the second to-be-selected evaluation phrase) can serve as a target evaluation phrase, the user may perform an operation on the terminal device. An action type of the operation is an action type of sending service quality evaluation content. In this case, the terminal device can determine the second to-be-selected evaluation phrase as the target evaluation phrase according to the user operation, and send the service quality evaluation content including the target evaluation phrase to a server. For another example, when the user considers that an evaluation phrase filled in the input box cannot serve as a target evaluation phrase, but an evaluation phrase in the displayed at least one second candidate evaluation phrase except the first evaluation phrase can serve as the target evaluation phrase, the user may perform another operation on the terminal device. An action type of the operation is an action type of determining the target evaluation phrase. In this case, the terminal device can determine, according to the user operation, the target evaluation phrase from evaluation phrases in the displayed at least one second candidate evaluation phrase except the first evaluation phrase, replace an original evaluation phrase in the input box with the determined target evaluation phrase, and display the target evaluation phrase in the input box. For another example, when the user considers that an evaluation phrase filled in the input box cannot serve as a target evaluation phrase, and the displayed at least one second candidate evaluation phrase is unsatisfactory, the user may perform a fourth operation on the terminal device. An action type of the fourth operation is an action type of replacing a displayed candidate evaluation phrase. In this case, the terminal device can display, according to the fourth operation of the user, another batch of candidate evaluation phrases for the user to select. Further, step 503 and step 504 may be performed.

Step 503. The terminal device obtains a fourth moving track of the terminal device, and determines a fourth action type according to the fourth moving track.

When the user considers that an evaluation phrase filled in the input box cannot serve as a target evaluation phrase, and the displayed at least one second candidate evaluation phrase is unsatisfactory, the user may perform a fourth operation on the terminal device. In this case, the terminal device can obtain the fourth moving track of the terminal device and determine, according to the fourth moving track, an action type of the fourth operation performed by the user, that is, the fourth action type.

For example, when the fourth operation is flipping, the fourth action type determined by the terminal device according to the fourth moving track captured by an acceleration sensor or a gyroscope is flipping.

Step 504. When the fourth action type is an action type of replacing a displayed candidate evaluation phrase, the terminal device replaces the at least one second candidate evaluation phrase with the at least one first candidate evaluation phrase, and displays the at least one first candidate evaluation phrase, and replaces the second to-be-selected evaluation phrase with the first to-be-selected evaluation phrase, and displays the first to-be-selected evaluation phrase.

After determining the fourth action type, the terminal device may perform matching on the fourth action type, and make a corresponding response according to a matching result. Further, when the fourth action type is the action type of replacing a displayed candidate evaluation phrase, the terminal device may call a corresponding interface in order to replace the at least one second candidate evaluation phrase displayed in step 502 with the at least one first candidate evaluation phrase and display the at least one first candidate evaluation phrase, and replace the second to-be-selected evaluation phrase displayed in the input box with the first to-be-selected evaluation phrase and display the first to-be-selected evaluation phrase in the input box. The first to-be-selected evaluation phrase is the first evaluation phrase in the at least one first candidate evaluation phrase.

For example, in this embodiment of the present disclosure, when flipping is an action type of replacing a displayed candidate evaluation phrase, the terminal device may select, from the candidate evaluation phrase set, a new batch of candidate evaluation phrases as first candidate evaluation phrases, replace the at least one second candidate evaluation phrase with the at least one first candidate evaluation phrase, display the at least one first candidate evaluation phrase, and display a to-be-selected evaluation phrase that replaces an original to-be-selected evaluation phrase. For a specific selection rule and a quantity of displayed second candidate evaluation phrases, refer to specific descriptions of corresponding content in step 502 in this embodiment of the present disclosure, and no details are repeated herein in this embodiment of the present disclosure. In addition, a quantity of selected first candidate evaluation phrases may be the same as or different from a quantity of second candidate evaluation phrases, and this is not limited herein in this embodiment of the present disclosure.

After the terminal device displays the first candidate evaluation phrase and the first to-be-selected evaluation phrase, the user can continue to perform a corresponding operation on the terminal device. In this case, the terminal device can continue to capture a moving track of the terminal device, and make a corresponding response according to an action type determined according to the moving track. For example, when the user considers that an evaluation phrase (that is, the first to-be-selected evaluation phrase) that replaces an evaluation phrase in the input box may serve as a target evaluation phrase, the user may perform an operation on the terminal device. An action type of the operation is an action type of sending service quality evaluation content. In this case, the terminal device can determine, as the target evaluation phrase according to the user operation, the first to-be-selected evaluation phrase filled in the input box, and send service quality evaluation content including the target evaluation phrase to a server. For another example, when the user considers that an evaluation phrase that replaces an evaluation phrase in the input box cannot serve as a target evaluation phrase, but an evaluation phrase in the displayed at least one first candidate evaluation phrase except the first evaluation phrase can serve as the target evaluation phrase, the user may perform, on the terminal device, an operation with an action type of determining the target evaluation phrase. In this case, the terminal device can determine the target evaluation phrase from evaluation phrases in the displayed at least one first candidate evaluation phrase except the first evaluation phrase according to the user operation, replace an original evaluation phrase in the input box with the determined target evaluation phrase, and display the target evaluation phrase in the input box. Further, step 505 and step 506 may be performed.

Certainly, when the user considers that an evaluation phrase that replaces the evaluation phrase in the input box cannot serve as a target evaluation phrase, and the displayed at least one first candidate evaluation phrase is still unsatisfactory, the user may continue to perform a fourth operation with an action type of replacing a displayed candidate evaluation phrase such that the terminal device continues to replace the displayed candidate evaluation phrase.

Step 505. The terminal device obtains a first moving track of the terminal device, and determines a first action type according to the first moving track.

The first action type is an action type of determining a target evaluation phrase.

Step 506. The terminal device determines a target evaluation phrase from evaluation phrases in the at least one first candidate evaluation phrase except the first evaluation phrase according to the first action type, replaces the first to-be-selected evaluation phrase in an input box with the determined target evaluation phrase, and displays the target evaluation phrase in the input box.

The user may perform a first operation on the terminal device when determining that the first to-be-selected evaluation phrase filled in the input box cannot serve as the target evaluation phrase, but the evaluation phrases in the displayed at least one first candidate evaluation phrase except the first evaluation phrase include desired evaluation content. In this case, the terminal device can obtain the first moving track of the terminal device, and determine, according to the first moving track, an action type of the first operation performed by the user, that is, the first action type. After determining the first action type, the terminal device can perform matching on the first action type. When the first action type is an action type of determining the target evaluation phrase, the terminal device can call a corresponding interface to determine the target evaluation phrase from the evaluation phrases in the displayed at least one first candidate evaluation phrase except the first evaluation phrase, replace the first to-be-selected evaluation phrase in the input box with the determined target evaluation phrase, and display the target evaluation phrase in the input box.

For example, when the first operation is shaking left and right, the first action type determined by the terminal device according to the first moving track captured by an acceleration sensor or a gyroscope is shaking left and right. When shaking left and right is the action type of determining the target evaluation phrase, the terminal device determines the target evaluation phrase from the evaluation phrases in the displayed at least one first candidate evaluation phrase except the first evaluation phrase, replaces an original evaluation phrase in the input box with the determined target evaluation phrase, and displays the determined target evaluation phrase in the input box.

In addition, when the first action type is the action type of determining the target evaluation phrase, the terminal device may select any candidate evaluation phrase in the at least one first candidate evaluation phrase except the first evaluation phrase as the target evaluation phrase, or may select, according to a range of a user action, a corresponding candidate evaluation phrase as the target evaluation phrase. For example, when the range of the user action is larger, a lower-ranking candidate evaluation phrase in displayed candidate evaluation phrases is used as the target evaluation phrase. A rule of selecting the target evaluation phrase is not limited herein in this embodiment of the present disclosure.

In this embodiment of the present disclosure, when providing a descriptive text evaluation on service quality of the target service, the user may further rate the service quality of the target service. Further, step 507 to step 509 may be performed.

Step 507. The terminal device displays a target service score.

It should be noted that a specific value of the target service score may be a highest or lowest score of service quality scores, or may be any value between the highest and lowest scores, and this is not limited herein in this embodiment of the present disclosure. In addition, a pentagon (or a pattern in another shape) may be displayed on the terminal device to represent a service quality score, or a specific numeral may be displayed to represent a service quality score, and this is not limited herein in this embodiment of the present disclosure.

After the terminal device displays the target service score, if the user is unsatisfied with the target service score, the user may perform a third operation on the terminal device such that the terminal device adjusts the service score according to the third operation, uses an adjusted service score as a target service score, and displays the target service score. Further, after the user performs the third operation, the terminal device may capture a third moving track of the terminal device, determine a third action type according to the third moving track, and performs matching on the third action type. When determining that the third action type is an action type of adjusting the service score, the terminal device may call a corresponding interface in order to adjust a value of the target service score.

For example, when the target service score is a highest score of service quality scores, each time the user performs the third operation on the terminal device once, 1 is subtracted from the value of the target service score. When the target service score is a lowest score of service quality scores, each time the user performs the fourth operation on the terminal device once, the value of the target service score is increased by 1. When the target service score is any value between the highest and lowest scores of service quality scores, two different operations may be set, for example, an operation 3 and an operation 3', each time the user performs the operation 3 on the terminal device once, the value of the target service score is increased by 1, each time the user performs the operation 3' on the terminal device once, 1 is subtracted from the value of the target service score.

It should be noted that in this embodiment of the present disclosure, a sequence of performing step 507 and performing step 502 to step 506 is not limited, that is, step 507 may be performed before step 502 to step 506, step 502 to step 506 may be performed before step 507, and certainly, step 502 and step 507 may be performed simultaneously, that is, the candidate evaluation phrase and the target service score are displayed simultaneously. The sequence of performing step 507 and performing step 502 to step 506 is not limited herein in this embodiment of the present disclosure.

Step 508. The terminal device obtains a second moving track of the terminal device, and determines a second action type according to the second moving track.

Step 509. The terminal device sends service quality evaluation content when determining that the second action type is an action type of sending the service quality evaluation content.

After the terminal device determines the target evaluation phrase and the target service score, the user may submit an evaluation on the service quality, and the user may perform a second operation on the terminal device. In this case, the terminal device can obtain a second moving track of the terminal device, and determine, according to the second moving track, an action type of the second operation performed by the user, that is, the second action type. The terminal device performs matching on the second action type. When the second action type is the action type of sending the service quality evaluation content, the terminal device can call a corresponding interface, to send the service quality evaluation content including the target evaluation phrase and the target service score to the server.

It should be noted that after the candidate evaluation phrase and the target service score are displayed, if the user is unsatisfied with all recommended candidate evaluation phrases, the user may manually enter descriptive text evaluation content. Certainly, the user may manually select a service score, and manually select and submit service quality evaluation content, or the user may complete some evaluations (for example, a descriptive text evaluation) using the method provided in this embodiment of the present disclosure, and complete some evaluations (for example, service quality rating) manually. This is not limited herein in this embodiment of the present disclosure. In addition, after the candidate evaluation phrase and the target service score are displayed, if the user does not perform any operation, the terminal device may send the target service score and a randomly selected candidate service score to the server as the service quality evaluation content.

For ease of understanding of a person skilled in the art, the service quality evaluation method provided in this embodiment of the present disclosure is described herein using examples.

Figure 6:
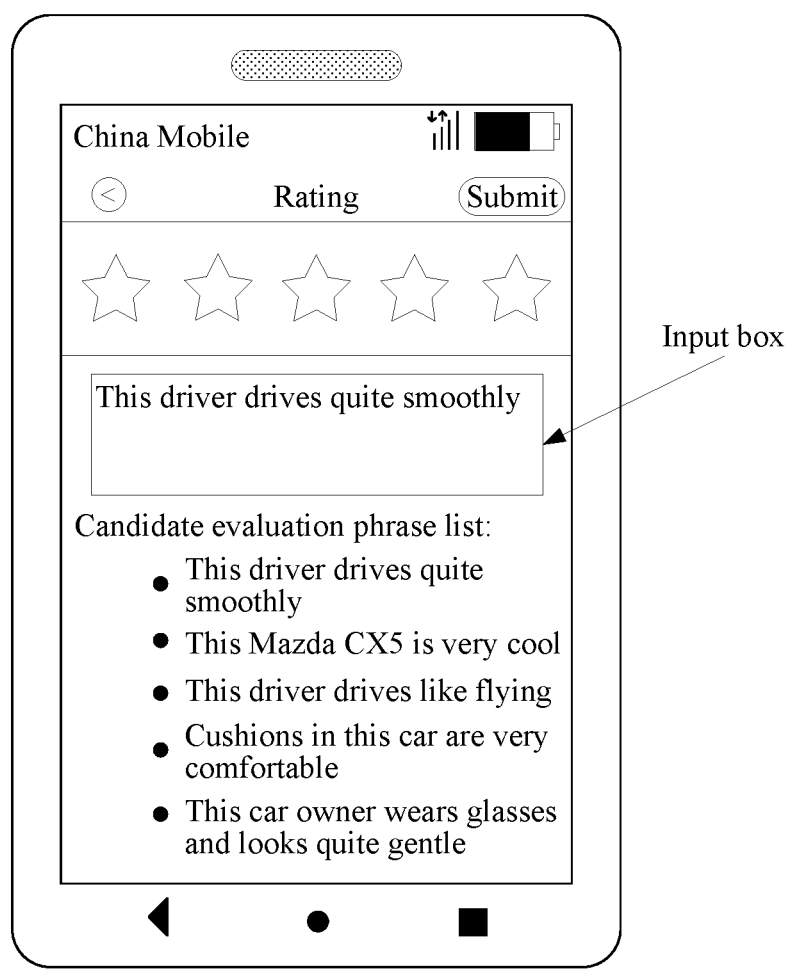
FIG. 6 is a schematic diagram of a scenario in which a service quality evaluation method in an embodiment of the present disclosure is used according to embodiments of the present disclosure.

It is assumed that a user uses taxi hailing software to appoint a car for Hitch and a system automatically deducts money when a car owner takes the user to a destination. In this case, the user needs to evaluate service quality of this car owner. When the taxi hailing software is started on the user's mobile phone, as shown in FIG. 6, five candidate evaluation phrases, a default target evaluation phrase (the default target evaluation phrase is the first one of the five candidate evaluation phrases), and a default target service score are displayed on the mobile phone. The default target evaluation phrase is displayed in an input box, and the five candidate evaluation phrases are displayed below the input box. The five candidate evaluation phrases include this driver drives quite smoothly, this Mazda CX5 is very cool, this driver drives like flying, cushions in this car are very comfortable, and this car owner wears glasses and looks gentle. The default target evaluation phrase is that this driver drives quite smoothly. The default target service score is five stars.

When the user is satisfied with both the default target evaluation phrase and the default target service score, the user may directly submit the service quality evaluation content. Further, based on FIG. 6, if the user considers that the target evaluation phrase "This driver drives quite smoothly" displayed in the input box may be used as evaluation content, and the service score may be five stars, the user may draw a circle using the mobile phone, as shown in FIG. 7A. In this case, the mobile phone determines that an action type is drawing a circle. When drawing a circle is an action type of sending service quality evaluation content, the mobile phone submits the service quality evaluation content including "This driver drives quite smoothly" and "five stars". After submission is complete, "Submitted" is displayed on the screen, as shown in FIG. 7B.

When the user is unsatisfied with the default target evaluation phrase and/or the default target service score, there are the following scenarios.

Figures 8A, 8B:
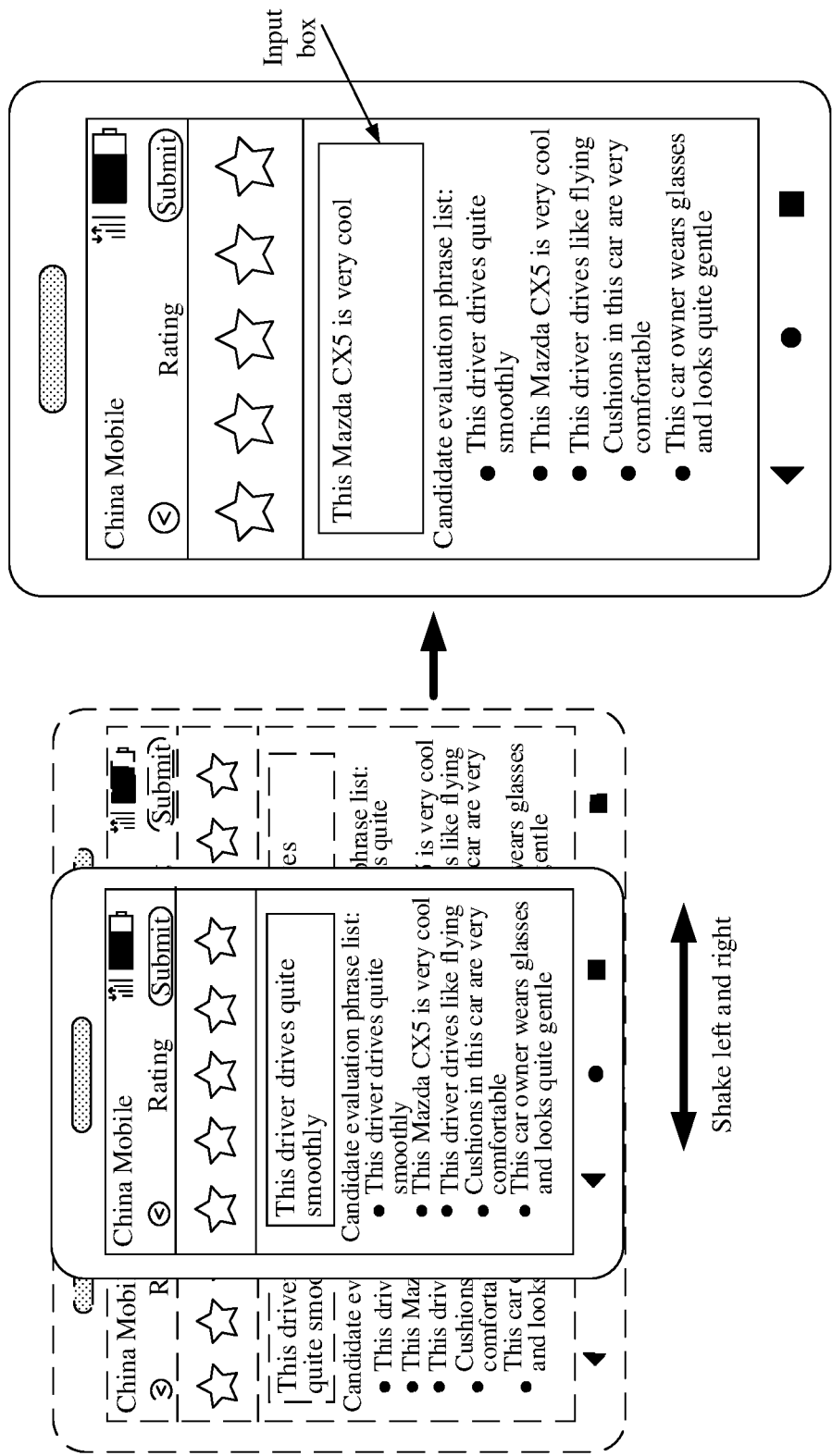
FIG. 8A is a schematic diagram of another scenario in which a service quality evaluation method in an embodiment of the present disclosure is used according to embodiments of the present disclosure.
FIG. 8B is a schematic diagram of another scenario in which a service quality evaluation method in an embodiment of the present disclosure is used according to embodiments of the present disclosure.

For selection of target evaluation content, there are the following two scenarios In a first scenario, based on FIG. 6, if the user considers that the target evaluation phrase "This driver drives quite smoothly" displayed in the input box cannot be used as evaluation content, and an evaluation phrase in the displayed five candidate evaluation phrases except "This driver drives quite smoothly" may be used as the evaluation content, the user can shake the mobile phone left and right, as shown in FIG. 8A. In this case, the mobile phone determines that an action type is shaking left and right. In addition, when shaking left and right is an action type of determining the target evaluation phrase, the mobile phone may determine, from evaluation phrases in the five candidate evaluation phrases in FIG. 6 except "This driver drives quite smoothly", a second candidate evaluation phrase as the target evaluation phrase, and display the second candidate evaluation phrase "This Mazda CX5 is very cool" in the input box in place of the original phrase "This driver drives quite smoothly", as shown in FIG. 8B. Certainly, the user may shake the mobile phone left and right for a plurality of times to determine another candidate evaluation phrase as the target evaluation phrase. When a quantity of leftward and rightward shaking times is greater than 4, the terminal device may select a candidate evaluation phrase as the target evaluation phrase, starting from the first candidate evaluation phrase again.

Figures 9A, 9B:
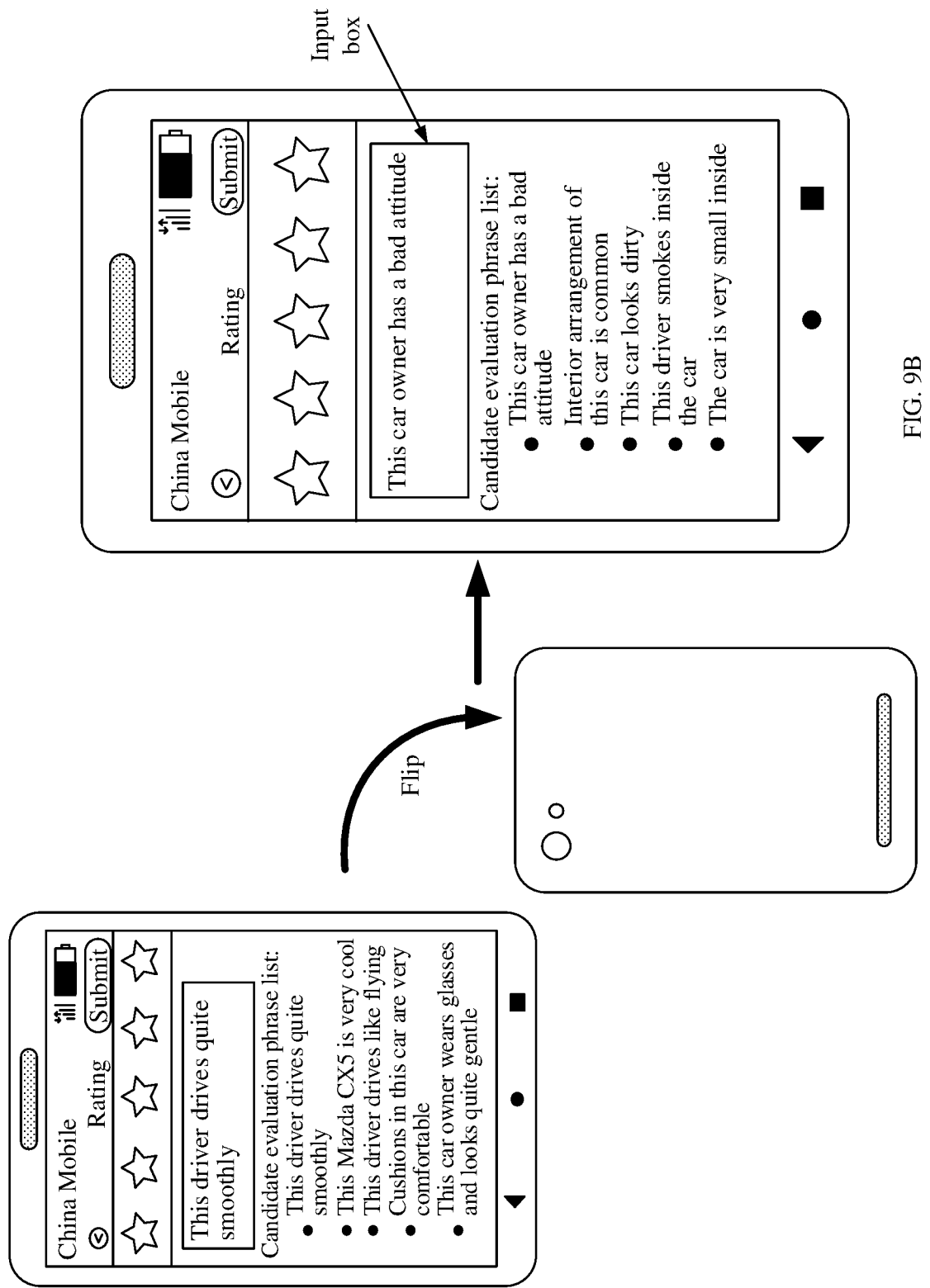
FIG. 9A is a schematic diagram of another scenario in which a service quality evaluation method in an embodiment of the present disclosure is used according to embodiments of the present disclosure.
FIG. 9B is a schematic diagram of another scenario in which a service quality evaluation method in an embodiment of the present disclosure is used according to embodiments of the present disclosure.

In a second scenario, based on FIG. 6, if the user considers that the target evaluation phrase "This driver drives quite smoothly" displayed in the input box cannot be used as evaluation content, and does not want to select any one of the displayed five candidate evaluation phrases as the target evaluation phrase, the user flips the mobile phone, as shown in FIG. 9A. In this case, the mobile phone determines that an action type is flipping. In addition, when flipping is an action type of replacing a displayed candidate evaluation phrase, the mobile phone displays a batch of candidate evaluation phrases in place of the original five ones, and replaces the evaluation phrase in the input box with the first evaluation phrase in the new batch of candidate evaluation phrases, as shown FIG. 9B. It is assumed that there are still five candidate evaluation phrases this car owner has a bad attitude, interior arrangement of this car is common, this car looks dirty, this driver smokes in the car, and the car is very small inside, and "this car owner has a bad attitude" is displayed in the input box. If the user considers that the target evaluation phrase "This car owner has a bad attitude" displayed in the input box can be used as evaluation content, it may be deemed that the target evaluation phrase has been determined. If the user considers that the target evaluation phrase "This car owner has a bad attitude" displayed in the input box cannot be used as evaluation content, but an evaluation phrase in the new batch of candidate evaluation phrases except "This car owner has a bad attitude" can be used as the evaluation content, the user can shake the mobile phone left and right such that the terminal device determines the target evaluation phrase. If the user is still unsatisfied with the five candidate evaluation phrases, the user may flip the mobile phone such that the terminal device replaces the displayed candidate evaluation phrases.

For selection of a service score, there are the following two scenarios.

In a first scenario, if a user is satisfied with a displayed default target service score (five stars), the user may not perform any operation. In this case, the mobile phone determines that the target service score is five stars.

Figures 10A, 10B:
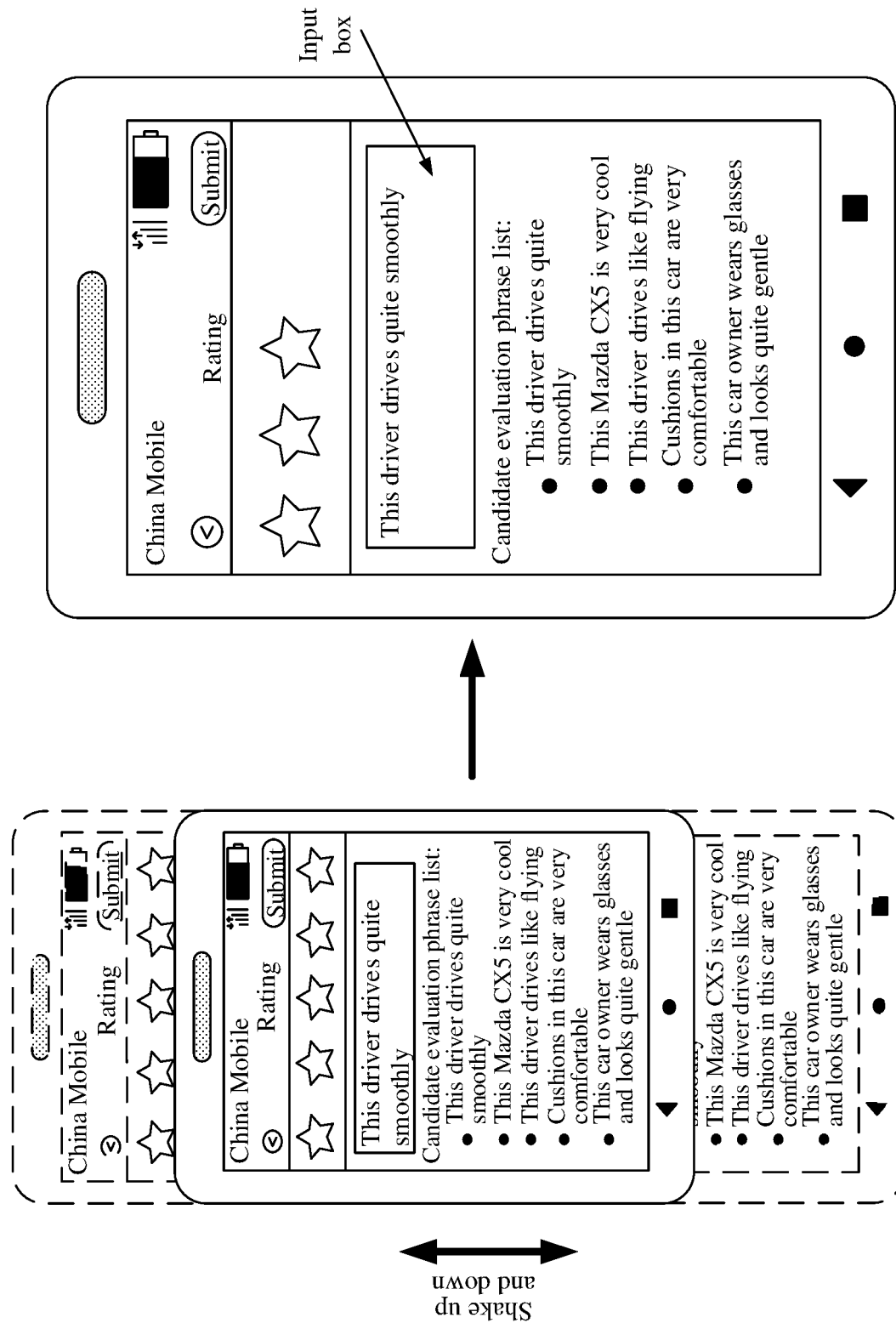
FIG. 10A is a schematic diagram of another scenario in which a service quality evaluation method in an embodiment of the present disclosure is used according to embodiments of the present disclosure.
FIG. 10B is a schematic diagram of another scenario in which a service quality evaluation method in an embodiment of the present disclosure is used according to embodiments of the present disclosure.

In a second scenario, it is assumed that a user is unsatisfied with a displayed default target service score, that is, five stars, and considers that three stars are appropriate. As shown in FIG. 10A, the user may shake the mobile phone up and down twice. In this case, the mobile phone determines that an action type is shaking up and down. In addition, when shaking up and down is an action type of adjusting a service score, the mobile phone may adjust the target service score to three stars according to a quantity of times of shaking performed by the user, as shown in FIG. 10B.

After the user selects the target evaluation phrase and the target service score, it is assumed that the target evaluation phrase is "Cushions inside this car is very comfortable", and the target service score is four stars, as shown in FIG. 11A. In this case, as shown in FIG. 11B, the user may draw a circle using the mobile phone. In this case, the mobile phone determines that an action type is drawing a circle. In addition, when drawing a circle is an action type of sending service quality evaluation content, the mobile phone submits the service quality evaluation content including the target evaluation phrase and the target service score. After submission is complete, "Submitted" is displayed on the screen, as shown in FIG. 11C.

It should be noted that the service quality evaluation method provided in this embodiment of the present disclosure may be applied to any O2O application scenario. For example, a user buys a cinema ticket online, and needs to use an O2O application to evaluate a film after watching the film, after using a park (or an amusement park) service bought online, a user needs to evaluate amusement facilities in the park, after a service is handled at a service window of an enterprise or a public institution, a user needs to evaluate service quality of service staff at the service window, after ordering a meal online, a user needs to evaluate a catering service using an O2O application, or a user books an accommodation online.

According to the service quality evaluation method provided in this embodiment of the present disclosure, the terminal device obtains the candidate evaluation phrase set obtained by analyzing the to-be-analyzed evaluation data of the target service using the target analysis model, displays the at least one first candidate evaluation phrase included in the candidate evaluation phrase set and the first to-be-selected evaluation phrase, determines the first action type according to the obtained first moving track, determines the target evaluation phrase according to the first action type, and sends the service quality evaluation content including the target evaluation phrase. In this way, a candidate evaluation phrase and a to-be-selected evaluation phrase are displayed such that when a user needs to provide a descriptive text evaluation on quality of an offline service using an O2O application, the user can select and submit the descriptive text evaluation by performing a corresponding operation on the terminal device with only one hand, with no need to operate the terminal device with both hands to enter text. This improves efficiency of evaluating service quality by a user. In addition, both the displayed candidate evaluation phrase and to-be-selected evaluation phrase are obtained by analyzing the to-be-analyzed evaluation data of the target service using the target analysis model, and include an evaluation phrase having personalized information content for evaluating service quality of the target service. In this way, service quality evaluations submitted by users are not monotonous evaluations, but personalized, specific, and accurate service evaluations such that a requirement on diversified service quality evaluations can be met, and a more valuable reference is provided for other users, to help the other users select a serving party according to service quality evaluation content. This better presents an important value and advantage of the O2O.

In addition, when the user needs to provide a service quality score, adjust a service quality score, and replace a candidate evaluation phrase, the user can complete a corresponding operation on the terminal device with only one hand. This brings convenience to the user and improves user experience.

Figure 12:
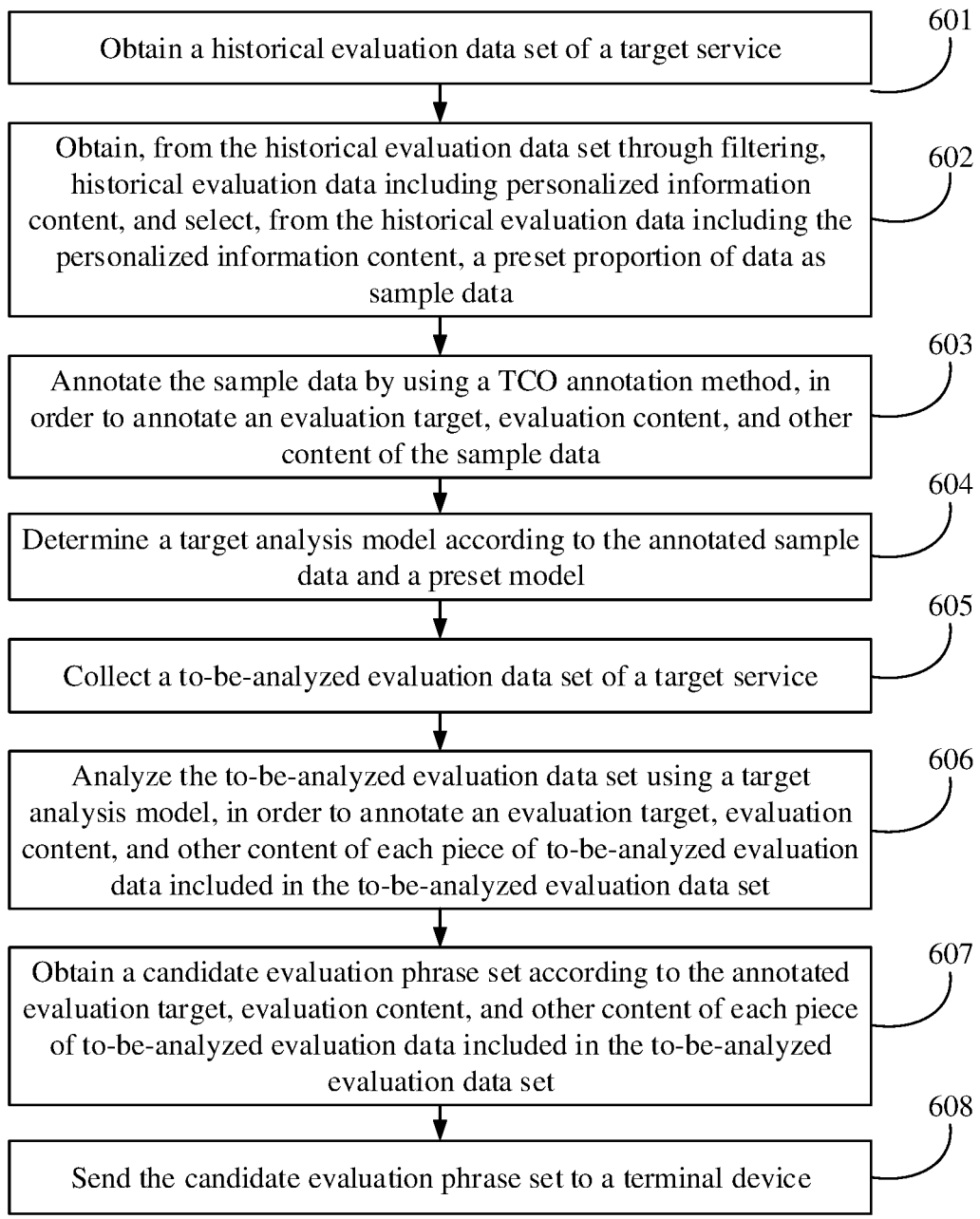
FIG. 12 is a flowchart of a candidate evaluation phrase generation method according to an embodiment of the present disclosure.

In addition, for ease of understanding of a person skilled in the art, a candidate evaluation phrase generation process is further described with reference to FIG. 12 in an embodiment of the present disclosure. FIG. 12 is a schematic flowchart of a candidate evaluation phrase generation method according to an embodiment of the present disclosure. As shown in FIG. 12, the method may include the following steps.

Step 601. Obtain a historical evaluation data set of a target service.

The historical evaluation data set includes a plurality of pieces of historical evaluation data. For example, when candidate evaluation phrases for a service need to be obtained, a target analysis model may be obtained by analyzing historical data of the service. In this embodiment of the present disclosure, for the target service, a specified amount of historical evaluation data may be obtained through a network using a crawler tool in order to obtain the historical evaluation data set that is of the target service and that includes a plurality of pieces of historical evaluation data. For example, historical evaluation data of a Hitch service, for example, this car for Hitch is a very cool Mazda CX5, this driver drives like flying, very good, this veteran driver drives quite smoothly, and good, can be obtained through crawling on a network.

Step 602. Obtain, from the historical evaluation data set through filtering, historical evaluation data including personalized information content, and select, from the historical evaluation data including the personalized information content, a preset proportion of data as sample data.

To provide a candidate evaluation phrase including personalized information content for a user, after the historical evaluation data set of the target service is obtained, cleansing and collation may be performed on the historical evaluation data set. That is, historical evaluation data that does not include personalized information content is removed from the historical evaluation data set, to obtain all historical evaluation data including personalized information content.

After all historical evaluation data including the personalized information content is obtained, a preset proportion of data may be selected as sample data. For example, eighty percent of the data is selected as the sample data, and the remaining twenty percent of the data is used for model assessment, or the data may be used to annotate an evaluation target, evaluation content, and other content of the data by performing step 603 in order to perform model assessment. Certainly, if the obtained historical evaluation data is an entire paragraph of evaluation data, the obtained historical evaluation data may be divided into sentences, and then filtering is performed.

For example, in the example in step 601, the historical evaluation data "This car for Hitch is a very cool Mazda CX5, and the driver drives like flying" may be divided into two pieces of data "This car for Hitch is a very cool Mazda CX5" and "The driver drives like flying". In addition, because the two pieces of historical evaluation data "Very good" and "Good" do not include personalized information content, obtained historical evaluation data including personalized information content is "This car for Hitch is a very cool Mazda CX5", "The driver drives like flying", and "This veteran driver drives quite smoothly".

Step 603. Annotate the sample data using a TCO annotation method in order to annotate an evaluation target, evaluation content, and other content of the sample data.

After the sample data is obtained, each piece of sample data may be annotated using the TCO annotation method in order to annotate an evaluation target, evaluation content, and other content of each piece of sample data. For example, for the sample data "This car for Hitch is a very cool Mazda CX5", "car for Hitch" and "Mazda CX5" are annotated as evaluation targets (Target), "very cool" is annotated as evaluation content (Comment), and other characters are annotated as other content. In other approaches annotation technology, generally, an entity such as a noun is automatically extracted and annotated. In this embodiment of the present disclosure, semantic analysis is performed on some syntactic structures such that emotional evaluation words or phrases (which include a plurality of words) with complete expressions can be automatically identified, for example, the evaluation content "very cool" can be identified.

In addition, it is well known that data annotation is a key step in an automatic information extraction technology. In a conventional technology, a common data annotation method is BIO or IOE, where "B" represents a start character of an annotated entity, "I" represents an intermediate character of the annotated entity, "E" represents an end character of the annotated entity, and "0" represents other characters. This method may be used in person name identification, where a start character (that is, a family name) needs to be annotated in an emphasized way, or may be used in geographic name identification, where an end character needs to be annotated in an emphasized way. However, in the candidate evaluation phrase generation method provided in this embodiment of the present disclosure, a phrase instead of only a word needs to be extracted, and an emphasis lies on identifying an evaluation target in the phrase (that is, a target object) and evaluation content (that is, an emotional description), but the evaluation target and the evaluation content are not necessarily in a start position or an end position. Therefore, the TCO annotation method is used in this embodiment of the present disclosure, where "T" represents an evaluation target, that is, a target object, "C" represents evaluation content, that is, "emotional evaluation content", and "O" represents other content. For example, when the TCO annotation method is used, sample data "音乐无疑是影片的灵魂" (whose English language translation is "Music is undoubtedly a soul of the film") may be annotated as "TTOOCCCCCC", or sample data "这车开得像飞" (whose English language translation is "This driver drives like flying") may be annotated as "OTTTCC".

Step 604. Determine a target analysis model according to the annotated sample data and a preset model.

After the evaluation target, evaluation content, and other content of the sample data are annotated, the sample data may be trained according to the annotated sample data and the preset model, to determine the target analysis model that is used to analyze to-be-analyzed evaluation data to annotate an evaluation target, evaluation content, and other content of the to-be-analyzed evaluation data. In addition, after the target analysis model is determined through training, other annotated sample data that is not used during model training may be further used to assess the target analysis model. If an assessment result is satisfactory, the assessment result is used as a final target analysis model, or if an assessment result is unsatisfactory, training may continue until a model whose assessment result is satisfactory is obtained and used as a target analysis model. The preset model includes at least one of the following models a CRF model, an RNN model, or an HMM.

In this embodiment of the present disclosure, a hybrid model (for example, a CRF model+an RNN model) may be used to obtain the target analysis model. Reasons are as follows. When the CRF model is independently used, there are numerous features of artificial construction, and particularly, features of an external dictionary have an obvious effect, and automatic identification accuracy is high. However, a disadvantage is that it is difficult to identify content of long-range association, for example, a comparative comment sentence, and a relative recall rate of the CRF model is low. In addition, when the RNN model is independently used (the RNN herein includes sub-models such as a long short-term memory (LSTM), a bidirectional LSTM, and a gene regulatory network (GRN)), because a deep learning model has a good effect on long-range dependency identification, and the RNN model itself can make a specific semantic analysis on a syntactic structure of a sentence, a recall rate of long sentences is high, but overall accuracy is lower than that of the CRF model, and running efficiency of the model is low. For example, in this embodiment of the present disclosure, the CRF model and the RNN model may be used together such that the CRF model is used for identifying evaluation content in a natural language, and the RNN model is used for identifying a type such as a long sentence or a comparative sentence. In this way, both automatic identification accuracy and a recall rate can be ensured. When the hybrid model is used, for data such as "This film is simpler and more understandable than The Great Beauty", "Lost and Love is far better than this film", "I don't think this film is good compared with the drama", and "Dishes in this restaurant is saltier than those in Old Country Restaurant", specific evaluation information can be understood according to a comparison between two entities, and the hybrid model has a particularly effective identification and optimization function. Certainly, in this embodiment of the present disclosure, a hybrid model of the CRF model and the RNN model is used only as an example for description. During specific application, specific models that are used together may be selected according to a requirement of an actual application scenario, and this is not limited in this embodiment of the present disclosure.

Step 605. Collect a to-be-analyzed evaluation data set of a target service.

After the target analysis model is obtained, for the target service, a specified amount of new historical evaluation data may be obtained through a network using a crawler tool in order to obtain the to-be-analyzed evaluation data set of the target service. The to-be-analyzed evaluation data set includes a plurality of pieces of to-be-analyzed evaluation data, and the to-be-analyzed evaluation data is descriptive text data.

Step 606. Analyze the to-be-analyzed evaluation data set using a target analysis model in order to annotate an evaluation target, evaluation content, and other content of each piece of to-be-analyzed evaluation data included in the to-be-analyzed evaluation data set.

After the to-be-analyzed evaluation data set of the target service is collected, the obtained target analysis model may be used to analyze each piece of to-be-analyzed evaluation data in the to-be-analyzed evaluation data set in order to annotate the evaluation target, evaluation content, and other content of each piece of to-be-analyzed evaluation data included in the to-be-analyzed evaluation data set.

Further, to improve identification accuracy of the target analysis model, when the target analysis model is used, an external feature may be introduced to jointly analyze the to-be-analyzed evaluation data set in order to annotate the evaluation target, evaluation content, and other content of each piece of to-be-analyzed evaluation data included in the to-be-analyzed evaluation data set. The external feature includes at least one of the following a target object dictionary, a dictionary of evaluation sentiment words (that is, an evaluation content dictionary), a static N-gram, or a dynamic N-gram.

A conventional N-gram feature construction method is to construct a static N-gram feature, that is, when a feature is constructed, an order-1 N-gram feature or an order-2 N-gram feature of each character is fixedly constructed, that is, an N value is specified in advance, and then a corresponding N-gram feature is generated according to content of to-be-analyzed evaluation data, that is, the N value is constant when to-be-analyzed data is analyzed, for example, N is preset to 2. In addition, because a calculation amount is quite large, features with 3 or more orders are seldom constructed.

However, in this embodiment of the present disclosure, according to different content of to-be-analyzed evaluation data, that is, after a special mark (for example, a condition preposition) of data is found, an attention-like model is used to determine focuses of the to-be-analyzed evaluation data and dynamically set N values, that is, different N-gram features are constructed according to different to-be-analyzed evaluation data. For example, in most cases, for each piece of the to-be-analyzed evaluation data, a forward order-1 feature (that is, one character before the character) and a backward order-1 feature (one character after the character). However, when a condition preposition such as "each", "if", or "because" is present in the to-be-analyzed evaluation data, the N value is dynamically adjusted to 3, that is, an order-3 N-gram feature is constructed, that is, three characters of each character are selected as features. In this way, during identification of continuous complex descriptions with a condition, more abundant features may be used for determining. This can improve identification accuracy.

For example, for data with a plurality of target objects, such as "none of characters, the story, or content are brilliant", continuous identification is required to completely identify a meaning that needs to be expressed. For another example, for continuous emotional description data with a condition, such as "it would be wonderful if the plot ratio and the story theme are adjusted", a meaning of a user comment can be identified only by connecting ideas logically. It is erroneous if "this film would be wonderful" is separately identified. For another example, for data about continuous expressions with a reason, such as "I gave four stars because I did not feel impatient during the 2-hour film and this film is such insipid", it is incomplete if "I gave four stars" or "such insipid" is separately identified. An evaluation target, evaluation content, and other content of the to-be-analyzed data can be accurately identified using the introduced dynamic N-gram and the target analysis model. It should be noted that the descriptions about the value of N in the static N-gram and dynamic N-gram are merely used as an example in this embodiment of the present disclosure, and a specific value may be set or adjusted according to a requirement of an actual application scenario. This is not further limited herein in this embodiment of the present disclosure.

Step 607. Obtain a candidate evaluation phrase set according to the annotated evaluation target, evaluation content, and other content of each piece of to-be-analyzed evaluation data included in the to-be-analyzed evaluation data set.

The candidate evaluation phrase set can be obtained after the evaluation target, evaluation content, and other content of each piece of to-be-analyzed evaluation data included in the to-be-analyzed evaluation data set are annotated.

Further, analysis may be performed on the obtained data to remove repeated content, and the obtained data may be sorted. Further, an evaluation target and evaluation content of the to-be-analyzed evaluation data may be combined according to the annotated evaluation target, evaluation content, and other content of each piece of to-be-analyzed evaluation data included in the to-be-analyzed evaluation data set, to obtain a first evaluation phrase set. The first evaluation phrase set includes at least a first evaluation phrase and a second evaluation phrase. For example, annotated evaluation targets include a driver and a car owner, and evaluation content includes an excellent skill and a very good skill, in this case, a first evaluation phrase "this driver has an excellent skill" and a second evaluation phrase "this car owner has a very good skill" may be obtained through combining. In this case, a similarity between the first evaluation phrase and the second evaluation phrase may be determined using a preset method, and when the similarity between the first evaluation phrase and the second evaluation phrase is greater than a preset threshold, the first evaluation phrase or the second evaluation phrase is deleted from the first evaluation phrase set, to obtain a second evaluation phrase set. The preset method includes any one of the following methods combination word2vec, or HowNet. The second evaluation phrase set includes a plurality of evaluation phrases. It is assumed that the combination word2vec method is used to perform calculation to obtain combination word2vec of evaluation phrases "the driver has an excellent skill" and "this car owner has a very good skill", and a cosine-based similarity and/or a difference is calculated to determine that a similarity between "the driver has an excellent skill" and "this car owner has a very good skill" is 0.95 and greater than a preset threshold 0.9. In this case, one phrase may be deleted, and only one phrase is reserved. Certainly, all evaluation phrases included in the second evaluation phrase set may be sorted according to a weight of each evaluation phrase included in the second evaluation phrase set, to obtain a candidate evaluation phrase set. The candidate evaluation phrase set includes all sorted evaluation phrases included in the second evaluation phrase set.

Step 608. Send the candidate evaluation phrase set to a terminal device.

According to the candidate evaluation phrase generation method provided in this embodiment of the present disclosure, the collected to-be-analyzed evaluation data set is analyzed using the target analysis model in order to annotate the evaluation target, evaluation content, and other content of each piece of to-be-analyzed evaluation data included in the to-be-analyzed evaluation data set, and then the candidate evaluation phrase set is obtained according to the annotated evaluation target, evaluation content, and other content of each piece of to-be-analyzed evaluation data included in the to-be-analyzed evaluation data set. Because the candidate evaluation phrase included in the obtained candidate evaluation phrase set includes the personalized information content for evaluating the service quality of the target service, service quality evaluations submitted by users according to the candidate evaluation phrase set are not monotonous evaluations, but personalized, specific, and accurate service evaluations such that a requirement on diversified service quality evaluations can be met, and a more valuable reference is provided for other users, to help the other users select a serving party according to service quality evaluation content. This better presents an important value and advantage of the O2O.

In addition, the TCO annotation method is used such that a target object and emotional evaluation content can be annotated without considering head and tail identification of an annotated entity. This reduces annotation types, and achieves higher determining efficiency. In addition, an external feature such as a customized dictionary can be used, achieving higher determining efficiency. The target analysis model is trained using a hybrid model, ensuring both automatic identification accuracy and a recall rate. When the target analysis model is used to analyze the to-be-analyzed evaluation data, an external feature such as a target object dictionary, a dictionary of evaluation sentiment words, or an N-order N-gram feature is introduced, improving identification accuracy of the target analysis model.

The foregoing mainly describes the solutions provided in the embodiments of the present disclosure from a perspective of interaction between network elements. It can be understood that, to implement the foregoing functions, various network elements such as the terminal device and the candidate evaluation phrase generation apparatus include corresponding hardware structures and/or software modules that perform the functions. A person skilled in the art may be easily aware that, in combination with the examples described in this embodiment disclosed in this specification, algorithm steps can be implemented in the present disclosure by a combination of hardware and computer software. Whether a function is implemented by hardware or computer software depends on particular applications and design constraint conditions of the technical solutions. A person skilled in the art may use different methods to implement the described functions for each particular application, but it should not be considered that the implementation goes beyond the scope of the present disclosure.

In this embodiment of the present disclosure, function module division may be performed on the terminal device and the candidate evaluation phrase generation apparatus according to the examples of the foregoing methods. For example, function modules are divided according to corresponding functions, or two or more functions are integrated into a processing module. The integrated module may be implemented in a form of hardware, or may be implemented in a form of a software function module. It should be noted that the module division in this embodiment of the present disclosure is an example, and is merely logical function division and may be other division in actual implementation.

Figure 13:
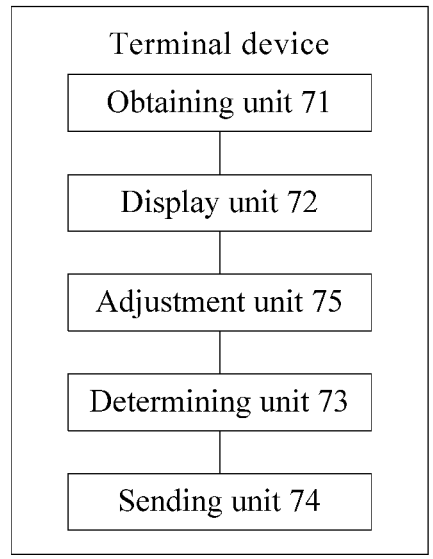
FIG. 13 is a schematic composition diagram of another terminal device according to an embodiment of the present disclosure.

When all function modules are divided according to corresponding functions, FIG. 13 is a schematic diagram of possible composition of a terminal device in an embodiment. As shown in FIG. 13, the terminal device may include an obtaining unit 71, a display unit 72, a determining unit 73, and a sending unit 74.

The obtaining unit 71 is configured to support the terminal device in performing step 401 and step 403 of obtaining a first moving track of the terminal device in the service quality evaluation method shown in FIG. 4, and performing step 501, step 503 of obtaining a fourth moving track of the terminal device, step 505 of obtaining a first moving track of the terminal device, and step 508 of obtaining a second moving track of the terminal device in the service quality evaluation method shown in FIG. 5.

The display unit 72 is configured to support the terminal device in performing step 402 in the service quality evaluation method shown in FIG. 4, and performing step 502, step 504, step 506 of replacing a first to-be-selected evaluation phrase in an input box and displaying a determined target evaluation phrase in the input box, and step 507 in the service quality evaluation method shown in FIG. 5.

The determining unit 73 is configured to support the terminal device in performing step 403 of determining a first action type according to the first moving track and step 404 in the service quality evaluation method shown in FIG. 4, and performing step 503 of determining a fourth action type according to the fourth moving track, step 505 of determining a first action type according to the first moving track, step 506 of determining, according to the second moving track, a target evaluation phrase from evaluation phrases in the at least one first candidate evaluation phrase except the first evaluation phrase according to the first action type, and step 508 of determining a second action type in the service quality evaluation method shown in FIG. 5.

The sending unit 74 is configured to support the terminal device in performing step 405 in the service quality evaluation method shown in FIG. 4 and step 509 in the service quality evaluation method shown in FIG. 5.

In this embodiment of the present disclosure, further, as shown in FIG. 13, the terminal device may further include an adjustment unit 75.

The adjustment unit 75 is configured to support the terminal device in performing a related operation of adjusting a service score in the service quality evaluation method shown in FIG. 5.

It should be noted that, for all related content of all steps in the method embodiments, reference may be made to function descriptions of corresponding function modules, and no details are repeated herein.

The terminal device provided in this embodiment of the present disclosure is configured to execute the foregoing service quality evaluation methods, and therefore, can achieve a same effect as the foregoing service quality evaluation methods.

Figure 14:
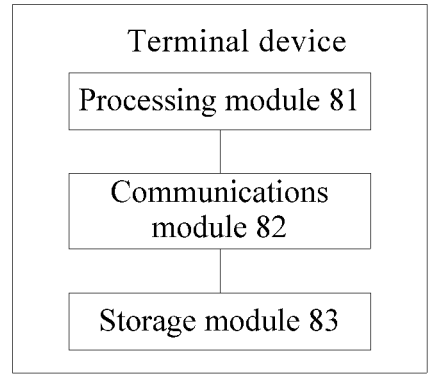
FIG. 14 is a schematic composition diagram of another terminal device according to an embodiment of the present disclosure.

When integrated units are used, FIG. 14 is a schematic diagram of another composition of a terminal device in an embodiment of the present disclosure. As shown in FIG. 14, the terminal device includes a processing module 81 and a communications module 82.

The processing module 81 is configured to control and manage an action of the terminal device. For example, the processing module 81 is configured to support the terminal device in performing step 401, step 402, step 403, and step 404 in FIG. 4, step 501, step 502, step 503, step 504, step 505, step 506, step 507, and step 508 in FIG. 5, and/or another process used in the technology described in this specification. The communications module 82 is configured to support the terminal device in communicating with another network entity, for example, communicating with the function module or network entity shown in FIG. 1, FIG. 3, FIG. 15, or FIG. 16. For example, the communications module 82 is configured to support the terminal device in performing step 405 in FIG. 4 and step 509 in FIG. 5. The terminal device may further include a storage module 83 configured to store program code and data of the terminal device.

The processing module 81 may be a processor or a controller. The processing module 81 may implement or execute various example logical blocks, modules, and circuits described with reference to content disclosed in the present disclosure. Alternatively, the processor may be a combination of processors implementing a computing function, for example, a combination of one or more microprocessors or a combination of a DSP and a microprocessor. The communications module 82 may be a transceiver, a transceiver circuit, a communications interface, or the like. The storage module 83 may be a memory.

Figure 15:
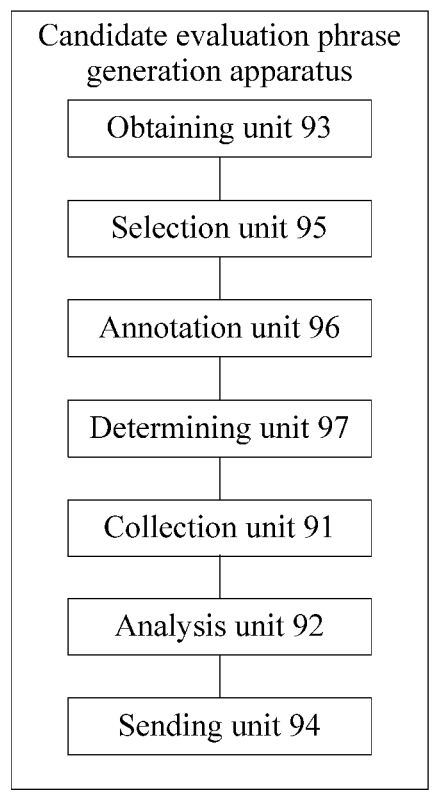
FIG. 15 is a schematic composition diagram of another candidate evaluation phrase generation apparatus according to an embodiment of the present disclosure.

When all function modules are divided according to corresponding functions, FIG. 15 is a schematic diagram of possible composition of a candidate evaluation phrase generation apparatus in an embodiment. As shown in FIG. 15, the candidate evaluation phrase generation apparatus may include a collection unit 91, an analysis unit 92, and an obtaining unit 93.

The collection unit 91 is configured to support the candidate evaluation phrase generation apparatus in performing step 605 in the candidate evaluation phrase generation method shown in FIG. 12.

The analysis unit 92 is configured to support the candidate evaluation phrase generation apparatus in performing step 606 in the candidate evaluation phrase generation method shown in FIG. 12.

The obtaining unit 93 is configured to support the candidate evaluation phrase generation apparatus in performing step 601 and step 607 in the candidate evaluation phrase generation method shown in FIG. 12.

In this embodiment of the present disclosure, further as shown in FIG. 15, the candidate evaluation phrase generation apparatus may further include a sending unit 94, a selection unit 95, an annotation unit 96, and a determining unit 97.

The sending unit 94 is configured to support the candidate evaluation phrase generation apparatus in performing step 608 in the candidate evaluation phrase generation method shown in FIG. 12.

The selection unit 95 is configured to support the candidate evaluation phrase generation apparatus in performing step 602 in the candidate evaluation phrase generation method shown in FIG. 12.

The annotation unit 96 is configured to support the candidate evaluation phrase generation apparatus in performing step 603 in the candidate evaluation phrase generation method shown in FIG. 12.

The determining unit 97 is configured to support the candidate evaluation phrase generation apparatus in performing step 604 in the candidate evaluation phrase generation method shown in FIG. 12.

It should be noted that, for all related content of all steps in the method embodiments, reference may be made to function descriptions of corresponding function modules, and no details are repeated herein.

The candidate evaluation phrase generation apparatus provided in this embodiment of the present disclosure is configured to execute the foregoing candidate evaluation phrase generation method, and therefore, can achieve a same effect as the foregoing candidate evaluation phrase generation method.

Figure 16:
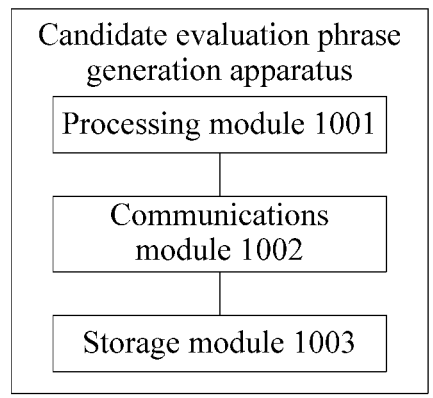
FIG. 16 is a schematic composition diagram of another candidate evaluation phrase generation apparatus according to an embodiment of the present disclosure.

When integrated units are used, FIG. 16 is a schematic diagram of another composition of the candidate evaluation phrase generation apparatus in the foregoing embodiment. As shown in FIG. 16, the candidate evaluation phrase generation apparatus includes a processing module 1001 and a communications module 1002.

The processing module 1001 is configured to control and manage an action of the candidate evaluation phrase generation apparatus. For example, the processing module 1001 is configured to support the candidate evaluation phrase generation apparatus in performing step 601, step 602, step 603, step 604, step 605, step 606, and step 607 in FIG. 6, and/or another process used in the technology described in this specification. The communications module 1002 is configured to support the candidate evaluation phrase generation apparatus in communicating with another network entity, for example, communicating with the function module or network entity shown in FIG. 1, FIG. 2, FIG. 13, or FIG. 14. The candidate evaluation phrase generation apparatus may further include a storage module 1003 configured to store program code and data of the candidate evaluation phrase generation apparatus.

The processing module 1001 may be a processor or a controller. The processing module 1001 may implement or execute various example logical blocks, modules, and circuits described with reference to content disclosed in the present disclosure. Alternatively, the processor may be a combination of processors implementing a computing function, for example, a combination of one or more microprocessors or a combination of a DSP and a microprocessor. The communications module 1002 may be a transceiver, a transceiver circuit, a communications interface, or the like. The storage module 1003 may be a memory.

When the processing module 1001 is a processor, the communications module 1002 is a communications interface, and the storage module 1003 is a memory, the candidate evaluation phrase generation apparatus in this embodiment of the present disclosure may be the candidate evaluation phrase generation apparatus shown in FIG. 4.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of the embodiments of the present disclosure essentially, or the part contributing to the other approaches, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A method, comprising:
obtaining a candidate evaluation phrase set that is pre-stored on a terminal device and that includes personalized information content of a user, wherein the candidate evaluation phrase set comprises at least two first candidate evaluation phrases, wherein each of the at least two candidate evaluation phrases is sorted according to a weight of each of the at least two candidate evaluation phrases, wherein the at least two first candidate evaluation phrases are based on analyzing to-be-analyzed evaluation data of a target service using a target analysis model, and wherein the at least two first candidate evaluation phrases comprise first personalized information content of the user of the terminal device to evaluate a service quality of the target service using the terminal device;
concurrently displaying the at least two first candidate evaluation phrases and displaying a first to-be-selected evaluation phrase that is a first evaluation phrase of the at least two first candidate evaluation phrases;
obtaining a first moving track of the terminal device when the at least two first candidate evaluation phrases are not satisfactory as a target evaluation phrase;
determining a first action type according to the first moving track, wherein the first action type is a flipping action of the terminal device for replacing the at least two first candidate evaluation phrases;
concurrently displaying at least two second candidate evaluation phrases of the candidate evaluation phrase set and displaying a second to-be-selected evaluation phrase from the at least two second candidate evaluation phrases according to the first action type;

determining a target evaluation phrase from the at least two second candidate evaluation phrases and the second to-be-selected evaluation phrase according to the first action type; and sending service quality evaluation content comprising the target evaluation phrase.

2. The method of claim 1, wherein determining the target evaluation phrase comprises determining the first to-be-selected evaluation phrase as the target evaluation phrase according to the first action type when the first action type is an action type of sending the service quality evaluation content.

3. The method of claim 1, wherein determining the target evaluation phrase comprises determining, according to the first action type, the target evaluation phrase from evaluation phrases in the at least two first candidate evaluation phrases except the first evaluation phrase when the first action type is an action type of determining the target evaluation phrase, and wherein before sending the service quality evaluation content, a service quality evaluation method further comprises:

obtaining a second moving track of the terminal device; and determining a second action type according to the second moving track, and wherein sending the service quality evaluation content comprises sending the service quality evaluation content when the second action type is an action type of sending the service quality evaluation content.

4. The method of claim 1, wherein the service quality evaluation content further comprises a target service score, and wherein before obtaining the first moving track and before determining the first action type, a service quality evaluation method further comprises displaying the target service score.

5. The method of claim 4, wherein after displaying the target service score, the service quality evaluation method further comprises:

obtaining a third moving track of the terminal device;

determining a third action type according to the third moving track; and adjusting the target service score when the third action type is an action type to adjust a service score.

6. The method of claim 1, wherein the second candidate evaluation phrase is based on analyzing the to-be-analyzed evaluation data of the target service using the target analysis model, wherein second personalized information content in the at least two second candidate evaluation phrases are different from the first personalized information content, and wherein the second to-be-selected evaluation phrase is a first evaluation phrase in the at least two second candidate evaluation phrases.

7. The method of claim 1, wherein the target analysis model is used to annotate an evaluation target, evaluation content, and other content of the to-be-analyzed evaluation data, and wherein the candidate evaluation phrase set is based on the annotated evaluation target, evaluation content, and other content of the to-be-analyzed evaluation data.

8. The method of claim 1, wherein the target analysis model is based on to a preset model and sample data that is annotated using a target comment other (TCO) annotation method, and wherein the preset model comprises at least one of a conditional random field model, a recurrent neural network model, or a hidden Markov model.

9. A terminal device, comprising:

a memory configured to store computer instructions; and at least two processors coupled to the memory and configured to execute the computer instructions, wherein the computer instructions cause the at least two processors to be configured to:

obtain a candidate evaluation phrase set that is pre-stored on the terminal device and that includes personalized information content of a user, wherein the candidate evaluation phrase set comprises at least two first candidate evaluation phrases, wherein each of the at least two candidate evaluation phrases is sorted according to a weight of each of the at least two candidate evaluation phrases, wherein the at least two first candidate evaluation phrases are based on analyzing to-be-analyzed evaluation data of a target service using a target analysis model, and wherein the at least two first candidate evaluation phrases comprise first personalized information content of the user of the terminal device to evaluate a service quality of the target service using the terminal device;

concurrently display the at least two first candidate evaluation phrases and display a first to-be-selected evaluation phrase that is a first evaluation phrase of the at least two first candidate evaluation phrases;

obtain a first moving track of the terminal device when the at least two first candidate evaluation phrases are not satisfactory as a target evaluation phrase;

determine a first action type according to the first moving track, wherein the first action type is a flipping action of the terminal device for replacing the at least two first candidate evaluation phrases;

concurrently display at least two second candidate evaluation phrases of the candidate evaluation phrase set and displaying a second to-be-selected evaluation phrase from the at least two second candidate evaluation phrases according to the first action type;

determine a target evaluation phrase from the at least two second candidate evaluation phrases and the second to-be-selected evaluation phrase according to the first action type; and send service quality evaluation content that comprises the target evaluation phrase.

10. The terminal device of claim 9, wherein the computer instructions further cause the at least two processors to be configured to determine the first to-be-selected evaluation phrase as the target evaluation phrase according to the first action type when the first action type is an action type of sending the service quality evaluation content.

11. The terminal device of claim 9, wherein when the first action type is an action type of determining the target evaluation phrase, the computer instructions further cause the at least two processors to be configured to:

determine, according to the first action type, the target evaluation phrase from evaluation phrases in the at least two first candidate evaluation phrases except the first evaluation phrase;

obtain a second moving track of the terminal device;

determine a second action type according to the second moving track; and send the service quality evaluation content when the second action type is an action type of sending the service quality evaluation content.

12. The terminal device of claim 9, wherein the service quality evaluation content further comprises a target service score, and wherein the computer instructions further cause the at least two processors to be configured to display the target service score.

13. The terminal device of claim 12, wherein the computer instructions further cause the at least two processors to be configured to:
   obtain a third moving track of the terminal device;
   determine a third action type according to the third moving track; and
   adjust the target service score when the third action type is an action type to adjust a service score.

14. The terminal device of claim 9, wherein the at least two second candidate evaluation phrases are based on analyzing the to-be-analyzed evaluation data of the target service using the target analysis model, wherein second personalized information content in the at least two second candidate evaluation phrases are different from the first personalized information content, and wherein the second to-be-selected evaluation phrase is a first evaluation phrase in the at least two second candidate evaluation phrases.

15. The terminal device of claim 9, wherein the target analysis model is used to annotate an evaluation target, evaluation content, and other content of the to-be-analyzed evaluation data, and wherein the candidate evaluation phrase set is based on an annotated evaluation target, an annotated evaluation content, and annotated other content of the to-be-analyzed evaluation data.

16. The terminal device of claim 9, wherein the target analysis model based on a preset model and sample data that is annotated using a target comment other (TCO) annotation method, and wherein the preset model comprises at least one of a conditional random field (CRF) model, a recurrent neural network (RNN) model, or a hidden Markov model (HMM).

17. A computer program product comprising computer-executable instructions for storage on a non-transitory computer readable storage medium that, when executed by a processor, cause a terminal device to:
   obtain a candidate evaluation phrase set that is pre-stored on the terminal device and that includes personalized information content of a user, wherein the candidate evaluation phrase set comprises at least two first candidate evaluation phrases, wherein each of the at least two candidate evaluation phrases is sorted according to a weight of each of the at least two candidate evaluation phrases, wherein the at least two first candidate evaluation phrases are based on analyzing to-be-analyzed evaluation data of a target service using a target analysis model, and wherein the at least two first candidate evaluation phrases comprise personalized information content of the user of the terminal device to evaluate a service quality of the target service using the terminal device;
   concurrently display the at least two first candidate evaluation phrases and display a first to-be-selected evaluation phrase that is a first evaluation phrase of the at least two first candidate evaluation phrases;
   obtain a first moving track of a terminal device when the at least two first candidate evaluation phrases are not satisfactory as a target evaluation phrase;
   determine a first action type according to the first moving track, wherein the first action type is a flipping action of the terminal device for replacing the at least two first candidate evaluation phrases;
   determine a target evaluation phrase from at least two second candidate evaluation phrases and a second to-be-selected evaluation phrase according to the first action type; and
   send service quality evaluation content that comprises the target evaluation phrase.

18. The computer program product of claim 17, wherein the computer-executable instructions further cause the terminal device to determine the first to-be-selected evaluation phrase as the target evaluation phrase according to the first action type when the first action type is an action type of sending the service quality evaluation content.

19. The computer program product of claim 17, wherein when the first action type is an action type of determining the target evaluation phrase, the computer-executable instructions further cause the terminal device to:
   determine, according to the first action type, the target evaluation phrase from evaluation phrases in the at least two first candidate evaluation phrases except the first evaluation phrase;
   obtain a second moving track of the terminal device;
   determine a second action type according to the second moving track; and
   send the service quality evaluation content when the second action type is an action type of sending the service quality evaluation content.

20. The computer program product of claim 17, wherein the service quality evaluation content further comprises a target service score, and wherein the computer-executable instructions further cause the terminal device to:
   obtain a third moving track of the terminal device;
   determine a third action type according to the third moving track; and
   adjust the target service score when the third action type is an action type of adjusting a service score.

* * * * *